(12) United States Patent
Liu

(10) Patent No.: US 12,741,651 B2
(45) Date of Patent: Sep. 22, 2026

(54) AUTOMOBILE TRANSPORTATION SAFETY MONITORING SYSTEM BASED ON DRIVER HOLOGRAPHIC MANAGEMENT

(71) Applicant: THE THIRD RESEARCH INSTITUTE OF MINISTRY OF PUBLIC SECURITY, Shanghai (CN)

(72) Inventor: Caixia Liu, Shanghai (CN)

(73) Assignee: THE THIRD RESEARCH INSTITUTE OF MINISTRY OF PUBLIC SECURITY, Shanghai (CN)

( * ) Notice: Subject to any disclaimer, the term of this patent is extended or adjusted under 35 U.S.C. 154(b) by 190 days.

(21) Appl. No.: 18/703,694

(22) PCT Filed: Nov. 4, 2022

(86) PCT No.: PCT/CN2022/129867
§ 371 (c)(1),
(2) Date: Apr. 22, 2024

(87) PCT Pub. No.: WO2023/236431
PCT Pub. Date: Dec. 14, 2023

(65) Prior Publication Data

US 2024/0416924 A1 Dec. 19, 2024

(30) Foreign Application Priority Data

Jun. 7, 2022 (CN) ........................ 202210640870.X

(51) Int. Cl.
*B60W 40/09* (2012.01)
*B60W 10/18* (2012.01)
(Continued)

(52) U.S. Cl.
CPC ............ *B60W 40/09* (2013.01); *B60W 10/18* (2013.01); *B60W 30/146* (2013.01);
(Continued)

(58) Field of Classification Search
CPC .... B60W 40/09; B60W 10/18; B60W 30/146; B60W 50/14; B60W 2040/0809;
(Continued)

(56) References Cited

U.S. PATENT DOCUMENTS

2008/0292146 A1* 11/2008 Breed .................. B60N 2/0026 382/118
2013/0069773 A1* 3/2013 Li ..................... B60W 30/0956 340/436
(Continued)

FOREIGN PATENT DOCUMENTS

CN 107590763 1/2018
CN 108688673 10/2018
(Continued)

OTHER PUBLICATIONS

Liu, Caixia; International Search Report and Written Opinion for PCT/CN2022/129867, filed Nov. 4, 2022, mailed Mar. 1, 2023, 13 pages.

*Primary Examiner* — Ryan W Sherwin
(74) *Attorney, Agent, or Firm* — Fennemore Craig, P.C.

(57) ABSTRACT

It is disclosed a vehicle transportation safety monitoring system based on driver holographic management. In the system, a driver identity verification unit reads driver certificate information and/or collects driver biometric information, and compares the information with biometric information corresponding to authorized driver identity information to complete driver identity verification, a vehicle control unit determines, according to an identity verification result, whether a vehicle can be started; emotion recognition and/or behavioral intelligent analysis and/or sensor monitoring data analysis and recognition is performed, and when the result triggers a warning, an operation such as automatic speed control is performed to control the movement of the vehicle. This system can bind a driver
(Continued)

identity with a driving permission of a designated operating vehicle, monitors a driver emotion, a driving behavior, and a fatigue status, and controls a vehicle driving status and/or sends a safety warning to a driver according to a monitoring result.

8 Claims, 5 Drawing Sheets

(51) Int. Cl.

| | |
|---|---|
| ***B60W 30/14*** | (2006.01) |
| ***B60W 50/14*** | (2020.01) |
| ***G06V 20/59*** | (2022.01) |
| ***G06V 40/16*** | (2022.01) |
| *B60W 40/08* | (2012.01) |

(52) U.S. Cl.
CPC ........... *B60W 50/14* (2013.01); *G06V 20/597* (2022.01); *G06V 40/161* (2022.01); *G06V 40/174* (2022.01); *B60W 2040/0809* (2013.01); *B60W 2040/0818* (2013.01); *B60W 2050/143* (2013.01); *B60W 2420/403* (2013.01); *B60W 2540/043* (2020.02); *B60W 2540/223* (2020.02)

(58) Field of Classification Search
CPC ... B60W 2040/0818; B60W 2050/143; B60W 2420/403; B60W 2540/043; B60W 2540/223; G06V 20/597; G06V 40/161; G06V 40/174; G06V 40/70; G07C 9/257; B60R 25/25; H04W 4/44; G06Q 10/083; G06Q 10/0833
See application file for complete search history.

(56) References Cited

U.S. PATENT DOCUMENTS

| | | | | |
|---|---|---|---|---|
| 2016/0196744 | A1* | 7/2016 | Razmi | G08G 1/096716 340/905 |
| 2017/0039356 | A1* | 2/2017 | Brewer | G06F 21/35 |
| 2018/0297603 | A1* | 10/2018 | Jun | G08G 1/167 |
| 2019/0138790 | A1* | 5/2019 | Matsumura | G06V 40/103 |
| 2019/0332106 | A1* | 10/2019 | Belloni Mourao | B60W 40/08 |
| 2021/0256248 | A1* | 8/2021 | Nagata | B60K 28/04 |
| 2022/0086335 | A1* | 3/2022 | Kim | G06V 40/16 |

FOREIGN PATENT DOCUMENTS

| | | |
|---|---|---|
| CN | 113353086 | 9/2021 |
| CN | 114912878 | 8/2022 |

* cited by examiner

AUTOMOBILE TRANSPORTATION SAFETY MONITORING SYSTEM BASED ON DRIVER HOLOGRAPHIC MANAGEMENT

CROSS-REFERENCE TO RELATED APPLICATIONS

The present application is a National Stage application of PCT international application: PCT/CN2022/129867, filed on 4 Nov. 2022, the disclosure of which is hereby incorporated by reference in its entirety.

TECHNICAL FIELD

The present invention relates to automobile (vehicle) transportation safety monitoring technologies, and specifically, to driving safety monitoring of operating vehicles such as road passenger transport, tourist passenger transport, hazardous chemical transport vehicles, freight vehicles, and school buses.

BACKGROUND

"Road passenger transport vehicles, tourist passenger transport vehicles, hazardous chemical transport vehicles, freight vehicles, and school buses" refer to chartered vehicles in tourism, passenger vehicles of Class 3 or above, hazardous chemical transport vehicles transporting dangerous chemicals/fireworks and firecrackers/civilian explosives, operating vehicles carrying goods, and passenger vehicles with more than 7 seats for pick-up and drop-off of students receiving compulsory education. Once this type of vehicle has a traffic accident, it often causes very serious consequences. Therefore, the "road passenger transport vehicles, tourist passenger transport vehicles, hazardous chemical transport vehicles, freight vehicles, and school buses" have always been listed as key control objects by the relevant sector authorities and strictly investigated and controlled.

In 2011, the Ministry of Communications, the Ministry of Public Transport, the State Administration of Work Safety, and the Ministry of Industry and Information Technology jointly issued the "Notice on Strengthening the Dynamic Supervision of Road Transport Vehicles", which clearly requires that from Aug. 1, 2011, before being delivered from the factory, satellite positioning devices that meet the "Technical Requirements for Vehicle Terminals of Satellite Positioning System for Road Transport Vehicles" should be installed in and the national key operating vehicle network joint control system should be connected with new "road passenger transport vehicles, tourist passenger transport vehicles, and hazardous chemical transport vehicles". For a vehicle that does not meet the regulation, the Ministry of Industry and Information Technology does not publish vehicle product announcement. When the road transport management department issues a road transport certificate for the vehicle, it needs to check installation and working conditions of a satellite positioning device of the vehicle. For newly added vehicles in which satellite positioning devices are not installed as required, the transport department does not issue road transport certificates.

For more than ten years, the installation and usage of vehicle-mounted terminals of satellite positioning systems for road transport vehicles have played an important role in promoting the safe driving management of "road passenger transport vehicles, tourist passenger transport vehicles, and hazardous chemical transport vehicles" and preventing vicious traffic accidents involving "road passenger transport vehicles, tourist passenger transport vehicles, and hazardous chemical transport vehicles".

However, in driver identity verification stipulated in the transportation industry standard JT/T 794-2019 "Technical Requirements for Vehicle Terminals of Satellite Positioning System for Road Transport Vehicles", only a driver IC card qualification certificate is used to recognize a driver identity. Whether holders are owners has no verification requirement, and there is a risk that unqualified drivers hold IC card qualification certificates of other drivers to illegally drive "road passenger transport vehicles, tourist passenger transport vehicles, and hazardous chemical transport vehicles".

Besides, the transportation industry standard JT/T 794-2019 "Vehicle-mounted Terminal Technical Requirements for Road Transport Vehicle Satellite Positioning System" stipulates that the fatigue driving warning is triggered when a single continuous driving time and a cumulative driving time of a vehicle or a driver exceed fatigue driving time thresholds, and stipulates that the fatigue driving time can be set remotely by a monitoring center. The single continuous driving time is 4 hours by default, and the cumulative driving time is 8 hours by default. According to this regulation, whether the driver has been driving for a long time before driving the current vehicle and the actual fatigue level when driving the current vehicle cannot be determined, and the driver may be actually in a status of fatigue driving before the fatigue driving warning stipulated in JT/T 794-2019 is triggered, and then fatigue driving causes drowsiness, distraction, slow response, decline in determination ability, and increase in operating errors and even trance, resulting in serious traffic accidents such as collisions, rollovers, and falling off cliffs.

In addition, unsafe driving behavior reminders stipulated in the transportation industry standard JT/T 794-2019 "Vehicle-mounted Terminal Technical Requirements for Road Transport Vehicle Satellite Positioning System" are mainly aimed at driver smoking, making phone calls, being distracted, and dozing off, and driver body postures and emotion statuses that may lead to traffic accidents are not paid attention to. Among the large number of traffic accidents that occur every year, the proportion of accidents caused by poor technologies is not high. Most of them are caused by the bad emotion statuses of drivers. In severe cases, bad emotions may even cause "road rage" and accidents are caused subjectively under impulse.

In addition, in recent years, "freight vehicles and school buses" that are not included in the management of "road passenger transport vehicles, tourist passenger transport vehicles, and hazardous chemical transport vehicles", that is, operating trucks and school buses with more than 7 seats, have also been listed as key control objects.

Therefore, how to effectively monitor and actively intervene in potential accident risks caused by drivers through effective technical means, and effectively improve the driving safety of the "road passenger transport vehicles, tourist passenger transport vehicles, hazardous chemical transport vehicles, school buses, and freight vehicles" is an urgent problem to be solved in this field.

SUMMARY

In view of the existing problems and loopholes in the vehicle terminal application used for safety supervision of operating vehicles, a new vehicle transportation safety monitoring solution is needed, to effectively monitor and actively intervene in the accident risk caused by the driver, overcome the technical defects in the safety supervision of operating vehicles, resolve the risk loopholes in the existing application solution, and eliminate the safety risks caused by the driver.

Therefore, the purpose of the present invention is to provide a vehicle transportation safety monitoring system based on driver holographic management, which adopts multiple driver identity verifications and multiple driver status monitoring technologies, implements linkage with the vehicle control, and effectively warns and actively intervenes in potential accident risks that may be caused by a driver. This avoids that the driver drives the vehicle in an abnormal emotion status and fatigue status that hinder safe driving and has abnormal behaviors that endanger driving safety, ensures that the driver drives the vehicle safely in a normal emotion status, mental status, and physical status, and ensures that the vehicle performs active intelligent safety prevention and control when the driver has abnormal emotions, abnormal behaviors, and a fatigue status, so as to improve vehicle running safety.

In order to achieve the above object, the vehicle transportation safety monitoring system based on driver holographic management provided by the present invention includes:

a driver identity verification unit, where the driver identity verification unit is arranged in a vehicle cab, is associated with a vehicle-mounted gateway unit, a vehicle control unit, and a warning prompt unit, and is associated with a remote management unit and/or the vehicle control unit through the vehicle-mounted gateway unit: the driver identity verification unit can collect current driver certificate information and/or biometric information: the driver identity verification unit can store the driver identity information and corresponding biometric information, or the driver identity information and corresponding biometric information may be stored in a data storage module of the vehicle-mounted gateway unit, or the driver identity verification unit is connected with the remote management unit in a wireless manner through a network communication module of the vehicle-mounted gateway unit, so that the driver identity information and the corresponding biometric information are obtained from the remote management unit, and the driver identity verification unit compares the currently collected driver real-time identity information and corresponding biometric information with stored driver identity information and corresponding biometric information for verification, and controls a working status of a vehicle starting system according to a verification result;

a driver status monitoring unit, where the driver status monitoring unit is arranged in a transport cab of the vehicle, at least provided with a driver front face monitoring component and/or a side panoramic behavior monitoring component and/or a seat pressure sensor monitoring component, and associated with the vehicle-mounted gateway unit, the vehicle control unit, and the warning prompt unit and associated with the remote management unit and/or the vehicle control unit through the vehicle-mounted gateway unit, the driver status monitoring unit monitors the driver emotion and/or driving behavior and/or physical fatigue status in real time, which can be transmitted to the remote management unit through an edge computing module of hardware of the status monitoring unit, an edge computing module of the vehicle-mounted gateway unit or a network communication module of the vehicle-mounted gateway unit for emotion recognition and/or behavior analysis and/or fatigue status determination, obtains, according to the real-time emotion recognition result and/or the abnormal behavior analysis result and/or the fatigue status determination result, management instructions generated based on a related emotion recognition result and/or behavior analysis result and/or fatigue status determination result or obtains the instructions from the remote management unit through the vehicle-mounted gateway unit, is directly associated with the vehicle control unit or is associated with the vehicle control unit through the vehicle-mounted gateway unit, and controls the working status of the vehicle anti-lock brake system (ABS) module, a speed limit management module, an intelligent brake management module, or an electronic brake assist (EBA) module to perform a speed limitation, speed control, or speed reduction operation;

the vehicle-mounted gateway unit, where the vehicle-mounted gateway unit is respectively associated with the driver identity verification unit, the driver status monitoring unit, the vehicle control unit, the warning prompt unit, and the remote management unit: the vehicle-mounted gateway unit can also cooperate with the driver identity verification unit and/or the driver status monitoring unit to complete driver identity verification and/or driver status monitoring: the vehicle-mounted gateway unit is specifically arranged in the cab of the vehicle, and is respectively associated with the driver identity verification unit, the driver status monitoring unit, the vehicle control unit, the warning prompt unit, and the remote management unit; and the vehicle-mounted gateway unit has at least a network communication module and/or a data storage module and/or an edge computing module and establishes a communication channel with the remote management unit to compare, recognize and analyze data information generated by the driver identity verification unit and/or the driver status monitoring unit, or transmit relevant information to the remote management unit for comparison, recognition and analysis, and send, to the vehicle control unit and the warning prompt unit, management data information returned by the remote management unit;

the vehicle control unit, where the vehicle control unit is arranged in the vehicle cab or the engine compartment of the vehicle, is linked with the starting system, the speed control system, and the braking system of the vehicle, and is associated with the vehicle-mounted gateway unit, the driver identity verification unit, and the driver status monitoring unit, and is associated with the warning prompt unit, the remote management unit and/or the driver identity verification unit and/or the driver status monitoring unit through the vehicle-mounted gateway unit: where the vehicle control unit controls, according to a driver identity verification result sent by the driver identity verification unit or the vehicle-mounted gateway unit, whether the vehicle can be started, and controls, according to a driver real-time emotion status analysis result, a driving behavior analysis result, and a fatigue status determination result sent by the driver status monitoring unit or the vehicle-mounted gateway unit, whether the vehicle performs speed limitation, speed reduction, or emergency braking;

the warning prompt unit, where the warning prompt unit is arranged in the transport cabin and outside the vehicle for vehicle transportation, and is respectively connected with the driver identity verification unit, the driver status monitoring unit, and the vehicle-mounted gateway unit; and the warning prompt unit sends a voice prompt or sound and light warning according to the driver identity verification result sent by the driver identity verification unit and the vehicle-mounted gateway unit, and sends a voice prompt or sound and light warning according to a driver real-time emotion status and driving behavior analysis result sent by the driver status monitoring unit or the vehicle-mounted gateway unit; and the remote management unit, where the remote management unit cooperates with the driver identity verification unit and/or the driver status monitoring unit to complete driver identity verification and/or driver status monitoring through the vehicle control unit, and can give corresponding vehicle management and driver management control instructions and feed back the instructions to the vehicle-mounted gateway unit, the remote management unit is arranged on a cloud platform and/or a local storage server of a government regulation department related to vehicle transportation and/or a personal handheld intelligent terminal of relevant management personnel, a cloud platform and/or a local storage server of the vehicle transport industry and related transport parties and/or a personal handheld intelligent terminal of relevant management personnel and a personal hand-held intelligent terminal of drivers and passengers, and is connected with the vehicle-mounted gateway unit: the remote management unit receives the driver identity verification result and the driver status monitoring result sent by the vehicle-mounted gateway unit and gives vehicle management and driver management control instructions, or receives a driver identity information collection result and a driver status monitoring information collection result sent by the vehicle-mounted gateway unit, compares and recognizes the identity information or consistency between the driver identity information and biometric information or related identity information and biometric and official archive database information and affiliated enterprise archive information, recognizes, analyzes, and determines a driver real-time emotion and/or an abnormal driving behavior and/or a fatigue status, gives vehicle management and driver management control instructions based on an emotion recognition result and/or an abnormal behavior analysis result and/or a fatigue status determination result, feeds back the instructions to the vehicle-mounted gateway unit, and feeds back the instructions to the warning prompt unit or the vehicle control unit through the vehicle-mounted gateway unit, to send a sound and light warning or a voice prompt or control the vehicle ACC to turn on or turn off or control the vehicle to perform speed limitation, speed reduction, or emergency braking.

Further, the driver identity verification unit includes:

an ID card reading module, configured to obtain identity information of a current driver certificate, and transmit the obtained identity information of the certificate to a biometric information comparison module of the ID card reading module or a biometric information comparison module of the vehicle-mounted gateway unit or a biometric information comparison module of the remote management unit through the vehicle-mounted gateway unit;

a biometric information collection module, configured to obtain current driver biometric information, and transmit the obtained information to a biometric information comparison module of the biometric information collection module or a biometric information comparison module of the vehicle-mounted gateway unit or a biometric information comparison module of the remote management unit through the vehicle-mounted gateway unit; and a biometric information comparison module, configured to compare obtained biometric information corresponding to the driver certificate identity information with current driver biometric information for verification to determine whether the information belongs to a same person.

Further, the ID card reading module of the driver identity verification unit includes and is not limited to a second-generation resident ID card reading device, an IC card practitioner qualification certificate reading device and/or a motor vehicle driver license reading device and/or another certificate (for example, a pass) reading device.

Further, the biometric information collection module of the driver identity verification unit includes and is not limited to a face information collection device, a fingerprint information collection device, an iris information collection device, a finger vein information collection device, a palm vein information collection device, a palmprint information collection device, a retina information collection device, and a voice information collection device, or another biometric information collection device (such as skin or palm geometric features).

The face information collection device is configured to collect driver front face information. A form of the face information collection device includes but is not limited to an external video collection camera and a built-in video collection camera. A type of the face information collection device includes but is not limited to a visible light video collection camera, a near-infrared video collection camera, and a dedicated camera or a 3D face collector for collecting 3D face information.

The fingerprint information collection device is configured to collect driver fingerprint information. A form of the fingerprint information collection device includes but is not limited to an external fingerprint collector and a built-in fingerprint collection component. A type of the fingerprint information collection device includes but is not limited to an optical fingerprint collector, a thermal fingerprint collector, and a biological radio frequency fingerprint collector.

The iris information collection device is configured to collect driver iris information. A form of the iris information collection device includes but is not limited to an external iris collector and a built-in iris collector. A type of the iris information collection device includes but is not limited to a monocular iris collector (device) and a binocular iris collector (device).

The finger vein information collection device is configured to collect driver finger vein information. A form of the finger vein information collection device includes but is not limited to an external finger vein pattern collector and a built-in finger vein collection component. A type of the finger vein information collection device includes but is not limited to a single finger vein collector and a finger vein plus fingerprint composite collector.

The palm vein information collection device is configured to collect driver palm vein information. A form of the palm vein information collection device includes but is not limited to an external desktop palm vein collector, an external handheld palm vein collector, and a built-in palm vein collection component. A type of the palm vein information collection device includes but is not limited to a single palm vein collector and a palm vein plus palmprint composite collector.

The palmprint information collection device is configured to collect driver palmprint information. A form of the palmprint information collection device includes but is not limited to an external desktop palmprint collector, an external handheld palmprint collector, and a built-in palmprint collection component. A type of the palmprint information collection device includes but is not limited to a single palmprint collector and a palmprint plus palm vein composite collector.

The retina information collection device is configured to collect driver retina information. A form of the retina information collection device includes but is not limited to an external retina collector and a built-in retina collector. A type of the retina information collection device includes but is not limited to a monocular retina collector (device) and a binocular retina collector (device).

The sound information collection device is configured to collect driver sound information. A form of the sound information collection device includes but is not limited to an external sound collector and a built-in sound collector. A type of the sound information collection device includes but is not limited to a megaphone, a microphone, and a pickup.

The another biometric information (such as skin and palm geometric features) collection device is configured to collect other biometric information such as driver internal skin biometric information and palm and finger physical feature information. A form of the another biometric information (such as skin and palm geometric features) collection device includes but is not limited to an external another biometric information (such as skin and palm geometric features) collector and a built-in another biometric information (such as skin and palm geometric features) collector. A type of the another biometric information (such as skin and palm geometric features) collection device includes but is not limited to a skin photoprint collector and a hand shape reader.

Further, the biometric information comparison module of the driver identity verification unit includes and is not limited to a face information comparison device, a fingerprint information comparison device, an iris information comparison device, a finger vein information comparison device, a palm vein information comparison device, a palmprint information comparison device, a retina information comparison device, and a voice information comparison device, or another biometric information comparison device (such as skin or palm geometric features).

The face information comparison device is configured to perform 1:1 comparison verification on face digital images and/or surface face images in a chip of a read ID card or other certificates and driver face image information collected on site, perform 1:1 comparison verification on driver face image information collected on site and face information corresponding to a read identity in a database and/or perform 1:N comparison verification on driver face image information collected on site and face information of all authorized drivers in the database. A form of the face information comparison device includes but is not limited to a built-in authorized person face database and comparison recognition component in the identity verification unit, an authorized person face database and comparison recognition component in the vehicle-mounted gateway unit, and an authorized person face database and comparison recognition component in the remote management unit.

The fingerprint information comparison device is configured to perform 1:1 comparison verification on fingerprint information in a chip of a read ID card or other certificates and driver fingerprint information collected on site, perform 1:1 comparison verification on driver fingerprint information collected on site and fingerprint information corresponding to a read identity in a database and/or perform 1:N comparison verification on driver fingerprint information collected on site and fingerprint information of all authorized drivers in the database. A form of the fingerprint information comparison device includes but is not limited to a built-in authorized person fingerprint database and comparison recognition component in the identity verification unit, an authorized person fingerprint database and comparison recognition component in the vehicle-mounted gateway unit, and an authorized person fingerprint database and comparison recognition component in the remote management unit.

The iris information comparison device is configured to perform 1:1 comparison verification on iris information (if exist) in a chip of a read ID card or other certificates and driver iris information collected on site, and/or perform 1:1 comparison verification on driver iris information collected on site and iris information corresponding to a read identity in a database and/or perform 1:N comparison verification on driver iris image information collected on site and iris information of all authorized drivers in the database. A form of the iris information comparison device includes but is not limited to a built-in authorized person iris database and comparison recognition component in the identity verification unit, an authorized person iris database and comparison recognition component in the vehicle-mounted gateway unit, and an authorized person iris database and comparison recognition component in the remote management unit.

The finger vein information comparison device is configured to perform 1:1 comparison verification on finger vein information (if exist) in a chip of a read ID card or other certificates and driver finger vein information collected on site, and/or perform 1:1 comparison verification on driver finger vein information collected on site and finger vein information corresponding to a read identity in a database and/or perform 1:N comparison verification on driver finger vein information collected on site and finger vein information of all authorized drivers in the database. A form of the finger vein information comparison device includes but is not limited to a built-in authorized person finger vein database and comparison recognition component in the identity verification unit, an authorized person finger vein database and comparison recognition component in the vehicle-mounted gateway unit, and an authorized person finger vein database and comparison recognition component in the remote management unit.

The palm vein information comparison device is configured to perform 1:1 comparison verification on palm vein information (if exist) in a chip of a read ID card or other certificates and driver palm vein information collected on site, and/or perform 1:1 comparison verification on driver palm vein information collected on site and palm vein information corresponding to a read identity in a database and/or perform 1:N comparison verification on driver palm vein information collected on site and palm vein information of all authorized drivers in the database. A form of the palm vein information comparison device includes but is not limited to a built-in authorized person palm vein database and comparison recognition component in the identity verification unit, an authorized person palm vein database and comparison recognition component in the vehicle-mounted gateway unit, and an authorized person palm vein database and comparison recognition component in the remote management unit.

The palmprint information comparison device is configured to perform 1:1 comparison verification on palmprint information (if exist) in a chip of a read ID card or other certificates and driver palmprint information collected on site, and/or perform 1:1 comparison verification on driver palmprint information collected on site and palmprint information corresponding to a read identity in a database and/or perform 1:N comparison verification on driver palmprint information collected on site and palmprint information of all authorized drivers in the database. A form of the palmprint information comparison device includes but is not limited to a built-in authorized person palmprint database and comparison recognition component in the identity verification unit, an authorized person palmprint database and comparison recognition component in the vehicle-mounted gateway unit, and an authorized person palmprint database and comparison recognition component in the remote management unit.

The retina information comparison device is configured to perform 1:1 comparison verification on retina information (if exist) in a chip of a read ID card or other certificates and driver retina information collected on site, and/or perform 1:1 comparison verification on driver retina information collected on site and retina information corresponding to a read identity in a database and/or perform 1:N comparison verification on driver retina image information collected on site and retina information of all authorized drivers in the database. A form of the retina information comparison device includes but is not limited to a built-in authorized person retina database and comparison recognition component in the identity verification unit, an authorized person retina database and comparison recognition component in the vehicle-mounted gateway unit, and an authorized person retina database and comparison recognition component in the remote management unit.

The sound information comparison device is configured to perform 1:1 comparison verification on sound information features (if exist) in a chip of a read ID card or other certificates and driver sound information features collected on site, and/or perform 1:1 comparison verification on driver sound information features collected on site and sound information features corresponding to a read identity in a database and/or perform 1:N comparison verification on driver iris image information collected on site and iris information of all authorized drivers in the database. A form of the sound information comparison device includes but is not limited to a built-in authorized person sound feature database and comparison recognition component in the identity verification unit, an authorized person sound feature database and comparison recognition component in the vehicle-mounted gateway unit, and an authorized person sound feature database and comparison recognition component in the remote management unit.

The another biometric information (such as skin and palm geometric features) comparison device is configured to perform 1:1 comparison verification on another biometric information (such as skin and palm geometric features) (if exist) in a chip of a read ID card or other certificates and another driver biometric information (such as skin and palm geometric features) collected on site, and/or perform 1:1 comparison verification on another driver biometric information (such as skin and palm geometric features) collected on site and another biometric information (such as skin and palm geometric features) corresponding to a read identity in a database and/or perform 1:N comparison verification on another driver biometric information (such as skin and palm geometric features) collected on site and another biometric information (such as skin and palm geometric features) of all authorized drivers in the database. A form of the another biometric information (such as skin and palm geometric features) comparison device includes but is not limited to a built-in authorized person another biometric (such as skin and palm geometric features) database and comparison recognition component in the identity verification unit, an authorized person another biometric (such as skin and palm geometric features) database and comparison recognition component in the vehicle-mounted gateway unit, and an authorized person another biometric (such as skin and palm geometric features) database and comparison recognition component in the remote management unit.

Further, the driver identity verification unit is directly associated with the vehicle control unit or indirectly associated with the vehicle control unit and/or the remote management unit through a vehicle-mounted gateway. When the driver identity verification unit is directly associated with the vehicle control unit, the ACC switch of the vehicle can be turned on normally after the driver identity verification succeeds; otherwise, the ACC switch of the vehicle cannot be turned on normally, the warning prompt unit sends a verification failure warning to prompt the driver to adjust the posture and re-collect biometrics, and a verification result and a vehicle startup status are uploaded to the remote management unit through the vehicle-mounted gateway unit. When the driver identity verification unit is indirectly associated with the vehicle control unit through the vehicle-mounted gateway unit, the vehicle-mounted gateway unit sends instructions to the vehicle control unit after the driver identity verification result is generated, after the verification succeeds, the ACC switch of the vehicle can be turned on normally: otherwise, the ACC switch of the vehicle cannot be turned on normally, the warning prompt unit sends a verification failure warning to prompt the driver to adjust the posture and re-collect biometrics, and the verification result and vehicle startup status are uploaded to the remote management unit through the vehicle-mounted gateway unit. When the driver identity verification unit is indirectly associated with the vehicle control unit through the vehicle-mounted gateway unit, but the biometric database and the comparison and recognition component are in the remote management unit, the driver ID card reading information and biometric collection information are uploaded to the remote management unit through the vehicle-mounted gateway unit, the remote management unit performs biometric information comparison and recognition, and then sends the verification result back to the vehicle-mounted gateway unit, the vehicle-mounted gateway unit sends instructions to the vehicle control unit, after the verification succeeds, the ACC switch of the vehicle can be turned on normally: otherwise, the ACC switch of the vehicle cannot be turned on normally, the warning prompt unit sends a verification failure warning to prompt the driver to adjust the posture and re-collect biometrics, and the vehicle startup status is uploaded to the remote management unit through the vehicle-mounted gateway unit. Under special conditions, the driver identity verification unit supports remote emergency authorization through the remote management unit.

Further, the driver status monitoring unit includes a real-time emotion recognition module and/or an abnormal behavior monitoring module and/or a fatigue status monitoring module.

The real-time emotion recognition module is configured to obtain the current driver face expression dynamics, and transmit the obtained face expression dynamics to an intelligent emotion analysis module of the real-time emotion recognition module or an intelligent emotion analysis module of the vehicle-mounted gateway unit or an intelligent emotion analysis module of the remote management unit through the vehicle-mounted gateway unit.

The abnormal behavior monitoring module is configured to obtain a current driver face movement or body movement, and transmit the obtained face movement or body movement to an abnormal behavior analysis module of the abnormal behavior monitoring module or an abnormal behavior analysis module of the vehicle-mounted gateway unit or to an abnormal behavior analysis module of the remote management unit through the vehicle-mounted gateway unit.

The fatigue status monitoring module is configured to obtain current driver fatigue status monitoring information, and transmit the obtained information to a fatigue status determination module of the fatigue status monitoring module or a fatigue status determination module of the vehicle-mounted gateway unit or a fatigue status determination module of the remote management unit through the vehicle-mounted gateway unit.

Further, the real-time emotion recognition module of the driver status monitoring unit includes a face high-speed camera device and an intelligent emotion analysis and recognition device.

The face high-speed camera device is configured to collect the current driver face expression dynamics. The face high-speed camera device includes but is not limited to an external high-speed video collection camera and a built-in high-speed video collection camera. A type of the face high-speed camera device includes but is not limited to a visible light high-speed video collection camera, a near-infrared high-speed video collection camera, and a dedicated high-speed camera or a 3D high-speed face expression dynamic collector for collecting 3D face expression dynamics.

The intelligent emotion analysis and recognition device is configured to perform intelligent analysis and recognition on the face expression dynamics collected by the face high-speed camera device, and determine a current driver real-time emotion status. The form of the emotion intelligent analysis and recognition device includes but is not limited to an emotion intelligent analysis and recognition component built in the driver status monitoring unit, an emotion intelligent analysis and recognition component in the vehicle-mounted gateway unit, and an emotion intelligent analysis and recognition component in the remote management unit. The type of the emotion intelligent analysis and recognition device includes but is not limited to face expression analysis, micro-expression analysis, and face micro-vibration analysis according to different technical principles.

Further, the abnormal behavior monitoring module of the driver status monitoring unit includes a head and face video collection device, a body panorama video collection device, and an abnormal behavior analysis and recognition device.

The head and face video collection device is configured to collect current driver head and face movements. The head and face video collection device includes but is not limited to an external video collection camera and a built-in video collection camera; and the type of the head and face video collection device includes but is not limited to a visible light video collection camera and a near-infrared video collection camera.

The body panorama video collection device is configured to collect a current driver body movement posture. The body panorama video collection device includes but is not limited to an external video collection camera and a built-in video collection camera; and the type of the body panorama video collection device includes but is not limited to a visible light video collection camera and an infrared video collection camera.

The abnormal behavior analysis and recognition device is configured to perform intelligent analysis and recognition on the head and face movement collected by the head and face video collection device and the body movement posture collected by the body panorama video collection device, to determine whether a current driver real-time behavior status is abnormal. The abnormal behavior analysis and recognition device includes but is not limited to an abnormal behavior analysis and recognition component built in the driver status monitoring unit, an abnormal behavior analysis and recognition component in the vehicle-mounted gateway unit, and an abnormal behavior analysis and recognition component in the remote management unit. The type of the abnormal behavior analysis and recognition device includes head and face movement analysis or body movement and posture analysis.

Further, the fatigue status monitoring module of the driver status monitoring unit includes a head and face video collection device, a fatigue status analysis device based on video analysis, a seat pressure status collection device, and a fatigue status analysis device based on sensor network analysis.

The head and face video collection device is configured to collect current driver head and face movements. The head and face video collection device includes but is not limited to an external video collection camera and a built-in video collection camera; and the type of the head and face video collection device includes but is not limited to a visible light video collection camera and a near-infrared video collection camera.

The fatigue status analysis device based on video analysis is configured to intelligently analyze and recognize the head and face movements collected by the head and face video collection device and determine current driver real-time fatigue. The fatigue status analysis device based on video analysis includes but is not limited to a fatigue status analysis component based on video analysis built in the driver status monitoring unit, a fatigue status analysis component based on video analysis in the vehicle-mounted gateway unit, and a fatigue status analysis component based on video analysis in the remote management unit.

The seat pressure status collection device is configured to collect pressure distribution of different points of a seat under the driver body. The seat pressure status collection device includes but is not limited to an external seat cushion laid on the seat, a pressure sensor on the backrest, and a built-in pressure sensor built in the seat. The type of the seat pressure status collection device includes but is not limited to piezoelectric sensors, piezoresistive sensors, and strain gauge sensors based on different technical principles.

The fatigue status analysis device based on sensor network analysis is configured to intelligently analyze and recognize the pressure distribution of the different points of the seat under the driver body collected by the seat pressure status collection device, and determine the current driver real-time fatigue. The fatigue status analysis device based on sensor network analysis includes but is not limited to a fatigue status analysis component based on sensor network analysis built in the driver status monitoring unit, a fatigue status analysis component based on sensor network analysis in the vehicle-mounted gateway unit, and a fatigue status analysis component based on sensor network analysis in the remote management unit.

Further, the driver status monitoring unit is directly associated with the vehicle control unit or indirectly associated with the vehicle control unit and/or the remote management unit through a vehicle-mounted gateway. When the driver status monitoring unit is directly associated with the vehicle control unit, and the driver real-time emotion recognition result and/or abnormal behavior monitoring result and/or fatigue status monitoring result reaches or exceeds a dangerous threshold, the vehicle control unit controls the vehicle to perform speed limitation, speed reduction, or emergency braking, the warning prompt unit sends a dangerous status or behavior warning prompt, and the analysis and recognition or determination result and the action status of the vehicle control unit are uploaded to the remote management unit through the vehicle-mounted gateway unit. When the driver status monitoring unit is indirectly associated with the vehicle control unit through the vehicle-mounted gateway unit, after the driver real-time emotion recognition result and/or abnormal behavior monitoring result and/or fatigue status monitoring result reaches or exceeds the dangerous threshold, the vehicle-mounted gateway unit sends instructions to the vehicle control unit, the vehicle control unit controls the vehicle to perform speed limitation, speed reduction, or emergency braking, and the warning prompt unit sends a dangerous status or behavior warning prompt, and the analysis and recognition or determination result and the action status of the vehicle control unit are uploaded to the remote management unit through the vehicle-mounted gateway unit. When the driver status monitoring unit is indirectly associated with the vehicle control unit through the vehicle-mounted gateway unit, but the fatigue status analysis component based on video analysis or the fatigue status analysis component based on sensor network analysis is in the remote management unit, the current driver face expression dynamic information collected by the face high-speed camera device in the real-time emotion recognition module, the current driver head and face movement and body movement posture information collected by the head and face video collection device and the body panorama video collection device in the abnormal behavior monitoring module, the current driver head and face movement information collected by the head and face video collection device in the fatigue status monitoring module, and the pressure information of different points of the seat under the driver body collected by the seat pressure status collection device are uploaded to the remote management unit through the vehicle-mounted gateway unit. The remote management unit performs intelligent analysis, recognition, or determining and then returns the analysis and recognition or determination result to the vehicle-mounted gateway unit, and the vehicle-mounted gateway unit sends instructions to the vehicle control unit: the vehicle control unit controls speed limitation, speed reduction, or emergency braking of the vehicle, the warning prompt unit sends a dangerous status or behavior warning prompt, and the action status of the vehicle control unit is uploaded to the remote management unit through the vehicle-mounted gateway.

Further, the vehicle-mounted gateway unit includes a network communication module and/or a data storage module and/or an edge computing module.

The network communication module is configured to perform data exchange between the driver identity verification unit or the driver status monitoring unit and the warning prompt unit, the vehicle control unit, and the remote management unit, forward, to the remote management unit, the ID card reading data, the biometric information collection data, or the identity verification result information uploaded by the driver identity verification unit, or send corresponding instructions to the vehicle control unit and the warning prompt unit according to the received driver identity verification result information: forward, to the remote management unit, the current driver face expression dynamic information and/or current driver head and face movement and body movement information and/or pressure distribution information of different points of the seat under the driver body or real-time emotion analysis and recognition result and/or abnormal behavior analysis and recognition result and/or the fatigue status determination result uploaded by the driver status monitoring unit, or send corresponding instructions to the vehicle control unit and the warning prompt unit according to the received driver real-time emotion analysis and recognition result and/or abnormal behavior analysis and recognition result and/or fatigue status determination result; or send corresponding instructions to the vehicle control unit and the warning prompt unit based on the driver identity verification result, real-time emotion analysis and recognition result and/or abnormal behavior analysis and recognition result and/or fatigue status determination result obtained by the edge computing module: or forward received management instructions of the remote management unit to the driver identity verification unit or the driver status monitoring unit or the warning prompt unit or the vehicle control unit.

The data storage module is configured to store the ID card read data, the biometric information collection data, or the authorized driver identity information database and the biometric information database uploaded by the driver identity verification unit, and the current driver face expression dynamic information and/or the current driver head and face movement and body movement information and/or the pressure distribution information of different points of seat under the driver body uploaded by the driver status monitoring unit.

The edge computing module is configured to compare, for verification, the ID card read data, the biometric information collection data, and information in the authorized driver identity information database and the biometric information database uploaded by the driver identity verification unit, and perform emotion intelligent analysis and recognition and/or abnormal behavior analysis and recognition and/or fatigue status analysis and determination on the current driver face expression dynamic information and/or the current driver head and face movement and body movement information and/or the pressure distribution information of different points of seat under the driver body uploaded by the driver status monitoring unit.

Further, the network communication module of the vehicle-mounted gateway unit includes a 5G communication device, a CAN bus communication device, a TCP/IP communication device, a Bluetooth (Bluetooth) communication device, and other wireless communication (Wi-Fi, UWB, Zigbee, and the like) devices.

The 5G communication device is configured to perform communication between the vehicle-mounted gateway unit and the remote management unit.

The CAN bus communication device is configured to perform wired communication between the vehicle-mounted gateway unit, the driver identity verification unit, the driver status monitoring unit, the warning prompt unit, and the vehicle control unit by using a CAN bus.

The TCP/IP communication device is configured to perform wired communication or wireless communication in TCP/IP mode between the vehicle-mounted gateway unit, the driver identity verification unit, the driver status monitoring unit, the warning prompt unit, the vehicle control unit, and the remote management unit.

The Bluetooth (Bluetooth) communication device is configured to perform wireless communication between the vehicle-mounted gateway unit, the driver identity verification unit, the driver status monitoring unit, and the warning prompt unit based on the Bluetooth (Bluetooth) protocol.

The another wireless communication (Wi-Fi. UWB. Zigbee, or the like) device is configured to perform wireless communication between the vehicle-mounted gateway unit, the driver identity verification unit, the driver status monitoring unit, and the warning prompt unit based on corresponding protocols such as Wi-Fi. UWB, and Zigbee.

Further, the data storage module of the vehicle-mounted gateway unit includes a built-in data storage device and an external data storage device.

The built-in data storage device is configured to store the ID card read data, the biometric information collection data, or the authorized driver identity information database and the biometric information database uploaded by the driver identity verification unit, and the current driver face expression dynamic information and/or the current driver head and face movement and body movement information and/or the pressure distribution information of different points of seat under the driver body uploaded by the driver status monitoring unit, and includes but is not limited to a built-in static random access memory SRAM, a built-in dynamic random access memory DRAM, a built-in hard disk, and a built-in read-only memory ROM. The built-in read-only memory ROM is configured to store the authorized driver identity information database and biometric information database. The external data storage device includes but is not limited to an external mobile hard disk, a USB flash disk, a TF memory card, an SD memory card, an erasable CD-RW, a DVD-RAM disc, and non-erasable CD-ROM and DVD-ROM discs, where the non-erasable CD-ROM and DVD-ROM discs are configured to store the authorized driver identity information database and biometric information database.

Further, the edge computing module of the vehicle-mounted gateway unit includes an AI intelligent chip with an edge computing function and a terminal SDK with edge computing.

The circuit board AI intelligent chip with an edge computing function and the terminal SDK with edge computing are configured to compare, for verification, the ID card read data, the biometric information collection data, and information in the authorized driver identity information database and the biometric information database uploaded by the driver identity verification unit, and perform emotion intelligent analysis and recognition and/or abnormal behavior analysis and recognition and/or fatigue status analysis and determination on the current driver face expression dynamic information and/or the current driver head and face movement and body movement information and/or the pressure distribution information of different points of seat under the driver body uploaded by the driver status monitoring unit.

Further, the vehicle-mounted gateway unit is directly associated with the driver identity verification unit, the driver status monitoring unit, the vehicle control unit, the warning prompt unit, and the remote management unit. When the vehicle-mounted gateway unit receives the driver identity verification success result, the vehicle-mounted gateway unit sends an instruction to the vehicle control unit to control the vehicle ACC to turn on, and forwards the driver identity verification result and the action information of the vehicle control unit to the remote management unit. When the vehicle-mounted gateway unit receives the driver identity verification failure result, the vehicle-mounted gateway unit sends an instruction to the vehicle control unit to control the vehicle ACC to turn off, sends an instruction to the warning prompt unit to prompt the driver to adjust the posture for re-verification, and forwards the driver identity verification result and the action information of the vehicle control unit to the remote management unit. When the vehicle-mounted gateway unit receives the driver status monitoring abnormal result, the vehicle-mounted gateway unit sends an instruction to the vehicle control unit to control the speed limitation, speed reduction or emergency braking of the vehicle, sends a dangerous status or dangerous behavior warning to the warning prompt unit and uses a voice prompt to prompt the driver to eliminate abnormal emotions or behaviors or prompt the driver to park and rest nearby, and forwards the driver status monitoring result and action information of the vehicle control unit to the remote management unit.

When the fatigue status analysis component based on video analysis or the fatigue status analysis component based on sensor network analysis are in the remote management unit, the vehicle-mounted gateway unit forwards the current driver face expression dynamic information collected by the face high-speed camera device, the current driver head and face motion and body motion posture information collected by the head and face video collection device and the body panoramic video collection device, the current driver head and face movement information collected by the head and face video collection device, and the pressure information of different points of the seat under the driver body collected by the seat pressure status collection device to the remote management unit: receives the analysis and recognition or determination result obtained by the remote management unit after analysis and recognition or determining and sends an instruction to the vehicle control unit and/or the warning prompt unit, and then uploads the action status of the vehicle control unit to the remote management unit.

Further, the warning prompt unit includes vehicle local warning prompt subunits and warning prompt subunits of remote monitoring client software such as government sector management client software, enterprise operation management client software, and driver and passenger service client software, such as an in-cab sound and light warning module, an in-cab voice prompt module, an out-cab sound and light warning module, and an out-cab voice prompt module.

The in-cab sound and light warning module is configured to send a sound and light warning when the driver identity verification fails, the driver emotion recognition result is abnormal, an abnormal behavior occurs, or the fatigue status determination result is abnormal.

The in-cab voice prompt module is configured to prompt the driver to start the vehicle when the driver identity verification succeeds, prompt the driver to adjust the posture for re-verification when the driver identity verification fails, prompt the driver to adjust the emotion or park nearly when the driver emotion recognition result is abnormal, prompt the driver to correct an unsafe driving behavior when the driver has an abnormal behavior, and prompt the driver to concentrate or park nearby when the fatigue status determination result is abnormal. The in-cab voice prompt module and the in-cab sound and light warning module can be set independently or combined into a voice sound and light warning device.

The out-cab sound and light warning module is configured to send a sound and light warning when the driver emotion recognition result is seriously abnormal, an abnormal behavior that causes serious driving risks occurs, and the fatigue status determination result is seriously abnormal.

The out-cab voice prompt module is configured to send a voice prompt when the driver emotion recognition result is seriously abnormal, an abnormal behavior that causes serious driving risks occurs, and the fatigue status determination result is seriously abnormal. The volume of the voice prompt and the volume of the warning sound are enough to cause passers-by to be highly alert in a noisy environment on the road, and the clarity of the voice broadcast of the voice warning content can be clearly understood by the listeners.

The government sector management client software is configured to: when driver identity verification fails, the driver emotion recognition result is abnormal, an abnormal behavior occurs, and the fatigue status determination result is abnormal, receive the warning information forwarded by the vehicle-mounted gateway through the communication center. When the government sector management client software receives information such as serious abnormalities in the driver emotion recognition result, an abnormal behavior that causes serious driving risks, and serious abnormalities in the fatigue status determination result, the government sector management client software starts the emergency management process according to the emergency plan by default.

The enterprise operation management client software is configured to: when driver identity verification fails, the driver emotion recognition result is abnormal, an abnormal behavior occurs, and the fatigue status determination result is abnormal, receive the warning information forwarded by the vehicle-mounted gateway through the communication center. When the enterprise operation management client software receives information such as serious abnormalities in the driver emotion recognition result, an abnormal behavior that causes serious driving risks, and serious abnormalities in the fatigue status determination result, the enterprise operation management client software starts the emergency management process according to the emergency plan by default, and simultaneously sends emergency warning information to the government sector management client.

The driver and passenger service client software is configured to: when driver identity verification fails, the driver emotion recognition result is abnormal, an abnormal behavior occurs, and the fatigue status determination result is abnormal, receive the warning information forwarded by the vehicle-mounted gateway through the communication center. The driver and passenger service client herein sends a voice prompt while sending warning information, and the content of the voice prompt varies according to different driver and passenger service client user roles. For example, the driver service client voice prompts the driver to adjust the posture for re-verification, prompts the driver to adjust the emotion or correct an unsafe driving behavior or prompts the driver to concentrate or park nearby; and the escort service client voice of a transport vehicles for hazardous chemicals prompts the escort to supervise the driver to adjust the emotion or correct an unsafe driving behavior or prompts to supervise the driver to concentrate or park nearby or the like.

Further, the warning prompt unit is directly associated with the driver identity verification unit, the driver status monitoring unit, and the vehicle-mounted gateway unit. When the vehicle local warning prompt subunit receives the driver identity verification failure result sent by the driver identity verification unit or sent by the driver identity verification unit through the vehicle-mounted gateway unit, the warning prompt unit sends a sound and light warning and voice prompts the driver to adjust the posture for re-verification. When the vehicle local warning prompt subunit receives the abnormal driver emotion recognition result, the abnormal behavior monitoring result, or the abnormal fatigue status monitoring result sent by the driver status monitoring unit or sent by the driver status monitoring unit through the vehicle-mounted gateway unit, the warning prompt unit sends a sound and light warning and voice prompts the driver to adjust emotions, correct unsafe driving behaviors, concentrate, or park nearby. When the vehicle local warning prompt subunit receives the serious abnormal driver emotion recognition result, serious abnormal behavior monitoring result, or serious abnormal fatigue status monitoring result sent by the driver status monitoring unit or sent by the driver status monitoring unit through the vehicle-mounted gateway unit, the warning prompt unit sends sound and light warnings inside and outside the vehicle and voice prompts the driver inside and outside the vehicle to adjust emotions, correct unsafe driving behaviors, concentrate, or park nearby, and prompts passers-by to be alert to abnormal vehicles and avoid them in time or call the police immediately. When the remote monitoring client software warning prompt subunit receives the driver identity verification failure result sent by the driver identity verification unit through the vehicle-mounted gateway unit and the communication center, the warning prompt unit sends a warning prompt. When the remote monitoring client software warning prompt subunit receives the abnormal driver emotion recognition result, the abnormal behavior monitoring result or the abnormal fatigue status monitoring result sent by the driver status monitoring unit through the vehicle-mounted gateway unit and the communication center, the warning prompt unit sends a warning prompt or a voice prompt. When the remote monitoring client software warning prompt subunit receives the serious abnormal driver emotion recognition result, serious abnormal behavior monitoring, or serious abnormal fatigue status monitoring result sent by the driver status monitoring unit through the vehicle-mounted gateway unit and the communication center, the warning prompt unit sends an emergency warning and a voice prompt and starts the emergency management process according to the emergency plan by default.

Further, the vehicle control unit includes an ACC vehicle start control module and/or an anti-lock brake system (ABS) module and/or a speed limit management module and/or an intelligent brake management module and/or an electronic brake assist (EBA) module.

The ACC vehicle start control module is configured to determine, after receiving the received driver identity verification result sent by the driver identity verification unit or forwarded by the vehicle-mounted gateway unit for the driver identity verification unit, whether to allow a vehicle switch to turn on, where the vehicle is allowed to start when the driver identity verification result is success, and the vehicle is not allowed to start when the driver identity verification result is failure.

The anti-lock brake system (ABS) module is configured to: when receiving an abnormal driver status monitoring result sent by the driver status monitoring unit or forwarded by the vehicle-mounted gateway unit for the driver status monitoring unit, prevent loss of control over a vehicle driving direction or sideslip during emergency braking.

The speed limit management module is configured to: when receiving an abnormal driver status monitoring result sent by the driver status monitoring unit or forwarded by the vehicle-mounted gateway unit for the driver status monitoring unit, control a maximum driving speed of the vehicle.

The intelligent brake management module is configured to: when receiving an abnormal driver status monitoring result sent by the driver status monitoring unit or forwarded by the vehicle-mounted gateway unit for the driver status monitoring unit, start the intelligent brake device to reduce a real-time driving speed of the vehicle.

The electronic brake assist (EBA) module is configured to: when receiving an abnormal driver status monitoring result sent by the driver status monitoring unit or forwarded by the vehicle-mounted gateway unit for the driver status monitoring unit, quickly activate all the braking force in need of emergency braking, to prevent the driver from being unresponsive in an abnormal status and prevent traffic accidents caused by an excessively long braking distance of the vehicle.

Further, the vehicle control unit is directly associated with the driver identity verification unit, the driver status monitoring unit and the vehicle-mounted gateway unit. When the vehicle control unit receives a driver identity verification success result or receives a driver identity verification success result forwarded by the vehicle-mounted gateway unit for the driver identity verification unit, the vehicle control unit controls the vehicle ACC to turn on; when the vehicle control unit receives a driver identity verification failure result, the vehicle control unit controls the vehicle ACC to turn off; and when the vehicle control unit receives a driver status monitoring abnormal result, the vehicle control unit controls the vehicle to perform speed limitation, speed reduction, or emergency braking.

Further, the remote management unit includes a government sector management client software, an enterprise operation management client software, a driver and passenger service client software, and a communication center.

The government sector management client software is configured to receive and display the driver ID card collection result, the driver biometric information collection result, and the identity verification result sent by the driver identity verification unit or forwarded by the vehicle-mounted gateway unit and the communication center for the driver identity verification unit, and perform supplementary content identity verification based on the driver ID card collection result and the driver biometric information collection result, and is configured to receive and display the driver status monitoring result sent by the driver status monitoring unit or forwarded by the vehicle-mounted gateway unit and the communication center for the driver status monitoring unit, send relevant management instructions and manage the driver based on the received driver status monitoring result, and when the driver status monitoring result show serious abnormalities, start the emergency management process and send relevant emergency response instructions.

The enterprise operation management client software is configured to receive and display the driver ID card collection result, the driver biometric information collection result, and the identity verification result sent by the driver identity verification unit or forwarded by the vehicle-mounted gateway unit and the communication center for the driver identity verification unit, and perform supplementary content identity verification based on the driver ID card collection result and the driver biometric information collection result, and is configured to receive and display the driver status monitoring result sent by the driver status monitoring unit or forwarded by the vehicle-mounted gateway unit and the communication center for the driver status monitoring unit, send relevant management instructions and manage the driver based on the received driver status monitoring result, and when the driver status monitoring result show serious abnormalities, start the emergency management process, send an emergency warning to the government sector management client, and send relevant emergency response instructions.

The driver and passenger service client software is configured to receive and display the identity verification result sent by the driver identity verification unit or forwarded by the vehicle-mounted gateway unit and the communication center for the driver identity verification unit, send, based on the driver identity verification result, a prompt to start the vehicle or adjust the posture for re-verification, receive the driver status monitoring result sent by the driver status monitoring unit or forwarded by the vehicle-mounted gateway unit and the communication center for the driver status monitoring unit, and send a relevant warning prompt according to the received driver status monitoring result.

The communication center is configured to communicate with the vehicle-mounted gateway unit, receive and store the driver ID card collection result, the driver biometric information collection result, or the identity verification result forwarded by the vehicle-mounted gateway unit for the driver identity verification unit, and receive and store the current driver face expression dynamic information collected by the face high-speed camera device in the real-time emotion recognition module of the driver status monitoring unit and forwarded by the vehicle-mounted gateway unit for the driver status monitoring unit, the current driver head face movement and body movement posture information collected by the head and face video collection device and the body panorama video collection device in the abnormal behavior monitoring module, the current driver head and face movement information collected by the head and face video collection device in the fatigue status monitoring module, and the pressure information of different points of the seat under the driver body or the driver status monitoring result collected by the seat pressure status collection device. When the biometric information comparison component, the emotion intelligent analysis and recognition component, the abnormal behavior analysis and recognition component, the fatigue status analysis component based on video analysis, or the fatigue status analysis component based on sensor network analysis is set in the remote management unit, biometric information comparison, emotion intelligent analysis and recognition, abnormal behavior analysis and recognition, and fatigue status analysis and determination can be performed through the cloud platform or local server of the communication center. The communication center serves as the computer system environment for the government sector management client software, the enterprise operation management client software, and the driver and passenger service client software at the same time, supports related software applications, and forwards management instructions or response instructions of the government sector management client software, the enterprise operation management client software, and the driver and passenger service client software to the vehicle-mounted gateway unit.

Further, the government sector management client of the remote management unit includes public security sector management client software, transportation sector management client software, emergency sector management client software, and other sector management client software (for example, insurance sector management client software) according to different industry departments.

The public security sector management client software is used for driver identity verification management, driver identity management, and driver abnormal behavior and fatigue status monitoring and warning. The driver identity verification management can be used for receiving the driver and passenger identity verification result and collecting statistics and making queries. Driver identity management can be used for receiving the driver identity information and the identity verification result, and comparing the information with motor vehicle driver license file information of the public security department for analysis. When the person's identity information or approved vehicle category is inconsistent with the driver license file information or an approved vehicle category of a personal motor vehicle driver license corresponding to the driver identity information does not include B2, a warning is sent. When the warning is sent, warning information is sent to the enterprise operation management client and the driver service client in the form of text, image, voice, and file, and linkage management information is sent according to the setting of the emergency plan. The driver abnormal behavior and fatigue status monitoring warning can be used for receiving and displaying the driver abnormal emotion and behavior and fatigue status monitoring warning information, and when receiving a high-risk warning, can be used for sending warning information to the enterprise operation management client and the driver and passenger service client in the form of text, image, voice, file, or the like and sending linkage management information according to the setting of the emergency plan.

The transportation sector management client software is used for driver identity verification management, driver authority supervision, driver abnormal behavior and fatigue status monitoring, driver and passenger file management, and driver behavior evaluation. The driver identity verification management can be used for receiving the driver and passenger identity verification result and collecting statistics and making queries. Driver permission supervision can be used for receiving and displaying driver identity verification warning information, supervising the driver permission of driving the vehicle, and providing emergency authorization for the driver permission. The driver abnormal behavior and fatigue status monitoring warning can be used for receiving and displaying the driver abnormal emotion and behavior and fatigue status monitoring warning information, and when receiving a high-risk warning, can be used for sending warning information to the enterprise operation management client and the driver and passenger service client in the form of text, image, voice, file, or the like and sending linkage management information according to the setting of the emergency plan. Driver and passenger file management can be used for managing files of drivers and passengers such as a driver or an escort of a dangerous chemical transport vehicle. File management content includes information such as name, gender, ID card numbers, enterprise name, qualification certificate numbers, qualification certificate validity period, and personnel category. Driver behavior evaluation supports driver behavior evaluation based on relevant information such as different alarm types, warning numbers, and warning levels.

The emergency sector management client software is used for driver identity verification management and driver abnormal behavior and fatigue status monitoring and warning. The driver identity verification management can be used for receiving the driver and passenger identity verification result and collecting statistics and making queries. The driver abnormal behavior and fatigue status monitoring warning can be used for receiving and displaying the driver abnormal emotion and behavior and fatigue status monitoring warning information, and when receiving a high-risk warning, can be used for sending warning information to the enterprise operation management client and the driver and passenger service client in the form of text, image, voice, file, or the like and sending linkage management information according to the setting of the emergency plan.

Other sector management client software (such as insurance sector management client software) is used for driver identity verification management or the like. The driver identity verification management can be used for receiving the driver and passenger identity verification result and collecting statistics and making queries. Other sector management client software supports function customization according to corresponding sector management needs, or independently chooses to enable or disable related monitoring client functions within the scope of user authority.

Further, the enterprise operation management client of the remote management unit includes consignor management client software, carrier management client software, and consignee management client software according to different users.

The consignor management client software is configured to query the driver identity information, and support querying identity information and a qualification certificate of a current transport driver or an escort of a dangerous goods transport vehicle corresponding to electronic waybill numbers, and a current transport identity verification:

The carrier management client software is used for driver identity verification management, driver abnormal behavior and fatigue status monitoring, driver overtime driving warning management, driver and passenger file management, and driver behavior evaluation. The driver identity verification management can be used for receiving the driver identity information and identity verification result, and performing identity verification and comparison analysis on the received driver and passenger identity information and driver and passenger file information of the unit and electronic waybill dispatching information. When the driver identity verification succeeds and is consistent with the driver and passenger file information of the unit and the electronic waybill dispatching information, a driving permission instruction is sent and the vehicle can be started and driven normally. When the driver identity verification fails or is inconsistent with the driver and passenger file information of the unit and the electronic waybill dispatching information, a driving forbidding instruction is sent, the vehicle cannot be started and driven normally, and warning information is sent to the driver and passenger service client in the form of text, image, voice, and file. When the driver identity verification fails or is inconsistent with the driver and passenger file information of the unit and the electronic waybill dispatching information, but the vehicle is started and driven abnormally, an emergency warning prompt is displayed and the corresponding unit of the vehicle-mounted device is controlled to send sound and light warning information inside and outside the vehicle. The driver identity verification management of the carrier management client supports remote authorization of driver permission and remote emergency start of the vehicle ACC switch, and supports statistics collection, analysis, and query of analysis results of comparison between the received driver and passenger identity verification result and driver and passenger identity information with the driver and passenger file information of the unit and the electronic waybill dispatching information. The driver abnormal behavior and fatigue status monitoring warning can be used for receiving and displaying the driver abnormal emotion and behavior and fatigue status monitoring warning information, and when receiving the warning, sending warning information to the driver and passenger service client in the form of text, image, voice, file, or the like, and when receiving a high-risk warning, sending warning information to the driver and passenger service client in the form of text, image, voice, file, or the like, and immediately sending linkage warning information to the government sector management client synchronously according to setting of the emergency plan. The driver overtime driving warning management can be used for receiving and displaying the driver overtime driving warning information, and when receiving the warning, sending warning information to the driver and passenger service client in the form of text, image, voice, file, or the like, and when receiving a high-risk warning, sending warning information to the driver and passenger service client in the form of text, image, voice, file, or the like, and immediately synchronously sending linkage warning information to the government sector management client according to setting of the emergency plan. Driver and passenger file management can be used for managing files of drivers and passengers such as a driver or an escort of a dangerous chemical transport vehicle or other vehicle personnel. File management content includes information such as name, gender, ID card numbers, qualification certificate numbers, qualification certificate validity period, personnel category, personnel household registration address, actual residential address, family member, and main social relations. It supports query, addition, deletion, modification, and editing of file content of drivers and passengers. When adding, deleting, and editing content of driver and passenger file information, prompt information is sent to the driver and passenger service client. A corresponding adding or deleting person or a file information content modification and editing person logs in and confirms the modification, and then the modification takes effect. It is supported that after the driver and passenger submits the application for addition, deletion, modification, and editing through the driver and passenger service client, the carrier management client confirms the archiving manner to add, delete, modify, and edit driver and passenger file information. Driver behavior evaluation supports driver behavior evaluation based on relevant information such as different warning types, warning numbers, warning levels, and warning processing statuses. Different warning types, warning numbers, warning levels, warning processing response time, and warning processing rates are respectively provided with different weights, and the weights support setting adjustment. The driver behavior evaluation result is quantified, quantified results are ranked and reports are generated, and it is supported to query according to the ranking of quantified evaluation results, vehicle type information, license plate number information, or driver information.

The consignee management client software is configured to query the driver identity information, and support querying identity information and a qualification certificate of a current transport driver or an escort of a dangerous goods transport vehicle corresponding to electronic waybill numbers, and a current transport identity verification result.

Further, the driver and passenger service management client of the remote management unit includes driver service client software and escort service client software according to different users.

The driver service client software is used for driver identity verification, driver abnormal behavior and fatigue status monitoring and warning, and driver overtime driving warning. The driver identity verification can be used for receiving the driver identity card information and biometric information and the identity verification result, when the identity verification succeeds and is consistent with the driver and passenger file information of the unit and the electronic waybill dispatch information, receiving and voice broadcasting a driving permission instruction sent by the carrier unit management client, to remind the driver to start and drive the vehicle normally, and when the identity verification fails or is inconsistent with the driver and passenger file information of the unit and the electronic waybill dispatch information, receiving and voice broadcasting a driving forbidding instruction sent by the carrier unit management client, and voice prompting the driver to adjust the posture and check the certificate. The driver abnormal behavior and fatigue status monitoring warning can be used for receiving and displaying the driver abnormal behavior and fatigue status monitoring warning information, when receiving a medium-risk or low-risk level warning, sending warning information through voice or specific preset sound, and when receiving a high-risk warning sent by the government sector management client and the carrier management client, sending warning information in the form of high-level warning content setting voice or specific high-level warning preset sound, and supporting feedback of a correction status and a corrective measure in the form of text, image, voice, file, or the like within a specified time. The driver overtime driving warning can be used for receiving and displaying driver overtime driving warning information, when receiving the overtime driving warning delivered by the government sector management client and the carrier management client, broadcasting warning information through voice, and after the vehicle corrects the violation of overtime driving, automatically providing feedback of the correction of overtime driving violation to the government sector management client and the carrier management client.

The escort service client software is used for driver abnormal behavior and fatigue status monitoring and warning, and driver overtime driving warning. The driver abnormal behavior and fatigue status monitoring warning can be used for receiving and displaying the driver abnormal behavior and fatigue status monitoring warning information, when receiving a medium-risk or low-risk level warning, sending warning information through voice or specific preset sound, and when receiving a high-risk warning sent by the government sector management client and the carrier management client, sending warning information in the form of high-level warning content setting voice or specific high-level warning preset sound, to continuously voice prompt the escort to supervise the driver to correct the abnormal behavior or park and rest when appropriate, and supporting feedback of a correction status and a corrective measure in the form of text, image, voice, file, or the like within a specified time. The driver overtime driving warning can be used for receiving and displaying driver overtime driving warning information, when receiving the overtime driving warning delivered by the government sector management client and the carrier management client, sending warning information through voice or preset sound, giving continuous voice prompts to the escort to supervise the driver to park and rest at a proper time, and after the vehicle corrects the violation of overtime driving, automatically providing feedback of the correction of overtime driving violation to the government sector management client and the carrier management client.

Further, the communication center of the remote management unit includes a cloud platform, a local server, and a personal mobile intelligent terminal.

The cloud platform is configured to store data information uploaded by the driver identity verification unit and the driver status monitoring unit, perform intelligent analysis, recognition, and determining of the data information uploaded by the driver identity verification unit and the driver status monitoring unit, receive data from the government sector management client software/enterprise operation management client software/driver and passenger service client software and call a shared data resource pool, support computer hardware platform environments applied in the government sector management client software/enterprise operation management client software/driver and passenger service client software, and perform communication interaction between the government sector management client software/enterprise operation management client software/driver and passenger service client software and the vehicle-mounted gateway unit. The cloud platform communicates with the vehicle-mounted gateway unit, receives and stores the driver ID card collection result, the driver biometric information collection result, or the identity verification result forwarded by the vehicle-mounted gateway unit for the driver identity verification unit, and receives and stores the current driver face expression dynamic information collected by the face high-speed camera device in the real-time emotion recognition module of the driver status monitoring unit and forwarded by the vehicle-mounted gateway unit for the driver status monitoring unit, the current driver head face movement and body movement posture information collected by the head and face video collection device and the body panorama video collection device in the abnormal behavior monitoring module, the current driver head and face movement information collected by the head and face video collection device in the fatigue status monitoring module, and the pressure information of different points of the seat under the driver body or the driver status monitoring result collected by the seat pressure status collection device. When the biometric information comparison component, the emotion intelligent analysis and recognition component, the abnormal behavior analysis and recognition component, the fatigue status analysis component based on video analysis, or the fatigue status analysis component based on sensor network analysis is set on the cloud platform, biometric information comparison, the emotion intelligent analysis and recognition, abnormal behavior analysis and recognition, and fatigue status analysis determination are performed by the cloud platform, and management instructions or response instructions of the government sector management client software, the enterprise operation management client software, and the driver and passenger service client software are forwarded to the vehicle-mounted gateway unit.

The local server is configured to store data information uploaded by the driver identity verification unit and the driver status monitoring unit, perform intelligent analysis, recognition, and determining of the data information uploaded by the driver identity verification unit and the driver status monitoring unit, receive data from the government sector management client software/enterprise operation management client software/driver and passenger service client software and call a data source, support computer hardware platform environments applied in the government sector management client software/enterprise operation management client software/driver and passenger service client software, and perform communication interaction between the government sector management client software/enterprise operation management client software/driver and passenger service client software and the vehicle-mounted gateway unit. The local server communicates with the vehicle-mounted gateway unit, receives and stores the driver ID card collection result, the driver biometric information collection result, or the identity verification result forwarded by the vehicle-mounted gateway unit for the driver identity verification unit, and receives and stores the current driver face expression dynamic information collected by the face high-speed camera device in the real-time emotion recognition module of the driver status monitoring unit and forwarded by the vehicle-mounted gateway unit for the driver status monitoring unit, the current driver head face movement and body movement posture information collected by the head and face video collection device and the body panorama video collection device in the abnormal behavior monitoring module, the current driver head and face movement information collected by the head and face video collection device in the fatigue status monitoring module, and the pressure information of different points of the seat under the driver body or the driver status monitoring result collected by the seat pressure status collection device. When the biometric information comparison component, the emotion intelligent analysis and recognition component, the abnormal behavior analysis and recognition component, the fatigue status analysis component based on video analysis, or the fatigue status analysis component based on sensor network analysis is set on the local server, biometric information comparison, the emotion intelligent analysis and recognition, abnormal behavior analysis and recognition, and fatigue status analysis determination are performed by the local server, and management instructions or response instructions of the government sector management client software, the enterprise operation management client software, and the driver and passenger service client software are forwarded to the vehicle-mounted gateway unit.

The personal hand-held intelligent terminal is used for the online query tool and temporary storage space of the data information uploaded by the driver identity verification unit and the driver status monitoring unit, supports computer hardware environments applied in the government sector management mobile client APP software/enterprise operation management mobile client APP software/driver and passenger service mobile client APP software, and performs the communication interaction between the government sector management mobile client APP software/enterprise operation management mobile client APP software/driver and passenger service mobile client APP software and the cloud platform or the local server and the vehicle-mounted gateway unit. The personal hand-held intelligent terminal communicates with the vehicle-mounted gateway unit through the cloud platform or the local server, receives the driver ID card collection result, the driver biometric information collection result, or the identity verification result forwarded by the vehicle-mounted gateway unit for the driver identity verification unit, receives the driver status monitoring warning information forwarded by the vehicle-mounted gateway unit for the driver status monitoring unit and forwarded by the cloud platform or the local server, and forwards the management instruction or response instruction of the government sector management mobile client APP software/enterprise operation management mobile client APP software/driver and passenger service mobile client APP software to the vehicle-mounted gateway unit.

Further, the remote management unit is arranged on a cloud platform and/or a local storage server of a government regulation department related to vehicle transportation and/or a personal handheld intelligent terminal of relevant management personnel, a cloud platform and/or a local storage server of the vehicle transport industry and related transport parties and/or a personal hand-held intelligent terminal of relevant management personnel and a personal hand-held intelligent terminal of drivers and passengers, and is connected with the vehicle-mounted gateway unit: the remote management unit receives the driver identity verification result and the driver status monitoring result sent by the vehicle-mounted gateway unit and gives vehicle management and driver management control instructions, or receives a driver identity information collection result and a driver status monitoring information collection result sent by the vehicle-mounted gateway unit, compares and recognizes the identity information or consistency between the driver identity information and biometric information or related identity information and biometric and official archive database information and affiliated enterprise archive information, recognizes, analyzes, and determines a driver real-time emotion and/or an abnormal driving behavior and/or a fatigue status, gives vehicle management and driver management control instructions based on an emotion recognition result and/or an abnormal behavior analysis result and/or a fatigue status determination result, feeds back the instructions to the vehicle-mounted gateway unit, and feeds back the instructions to the warning prompt unit or the vehicle control unit through the vehicle-mounted gateway unit, to send a sound and light warning or a voice prompt or control the vehicle ACC to turn on or turn off or control the vehicle to perform speed limitation, speed reduction, or emergency braking.

The vehicle transportation safety monitoring system based on driver management provided by the present invention can perform identity verification based on biometric recognition technologies for authorized vehicle drivers, control the startup permission of the vehicle according to the driver identity verification result, monitor the driver face dynamic expression or face vibration amplitude and face movement and body movement posture and pressure statuses in different areas of the seat under the driver body in real time during vehicle driving, comprehensively analyze the driver real-time emotion status, intelligently recognize whether the driver has abnormal behaviors that affect safe driving, cautiously determine the real-time fatigue level of the driver, automatically control the vehicle to perform automatic speed limitation, speed reduction, or emergency brake according to the emotion status and abnormal behavior monitoring and real-time fatigue status analysis and recognition result, and send voice prompts or sound and light warnings to effectively warn and actively intervene in potential accident risks that may be caused by driver factors. This avoids that the driver drives the vehicle in an abnormal emotion status and in a fatigue status that hinder safe driving or has abnormal behaviors that endanger driving safety, ensures that the driver drives the vehicle safely in a normal emotion, mental, and physical status, and ensures that the vehicle performs active intelligent safety prevention and control when the driver has abnormal emotions or behaviors or a fatigue status, so as to improve vehicle running safety.

Furthermore, the vehicle transportation safety monitoring system provided by the present invention can bind a driver identity with driving permission of a designated operating vehicle and startup permission of a specific vehicle, can monitor the driver emotion and driving behavior and fatigue status in real time during driving, and automatically control the vehicle driving status in a linkage manner through active driving assisted by safety prevention and control according to the monitoring result and give a safety warning to the driver, so as to ensure the safe operation of automobile transportation from the perspective of the driver.

At the same time, the remote management unit of the vehicle transportation safety monitoring system provided by the present invention can perform the overall safety monitoring function of the system, and at the same time provide the basis and specific solution for the driver identity and working status management of transportation-related enterprise operation and management units such as the carrier, consignor, and consignee, can provide basis for evaluation and management on the driver identity and working status and the overall safe running status of the unit for government sector management departments such as public security departments, traffic management departments, and emergency management departments, and provide guidance safe driving service support for the driver. Through the joint efforts of multiple parties, the integrated application of advanced technologies eliminates the hidden dangers of vehicle driving safety of “road passenger transport vehicles, tourist passenger transport vehicles, hazardous chemical transport vehicles, school buses, and freight vehicles” caused by the driver factors, effectively prevents and curbs severe traffic accidents that cause the mass death and injury, protects the lives and property of the people, maintains national stability, and ensures social harmony.

BRIEF DESCRIPTION OF THE DRAWINGS

The present invention will be further described below in conjunction with the accompanying drawings and specific embodiments.

DETAILED DESCRIPTION

Figure 1:
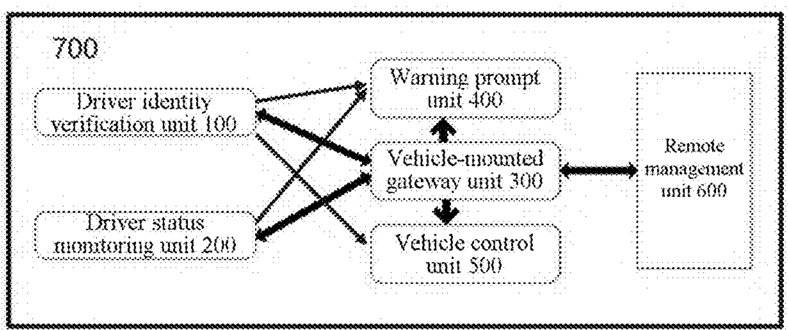
FIG. 1 is a schematic diagram of an overall composition principle of a vehicle transportation safety monitoring system based on driver management according to an embodiment of the present invention.

In order to make the technical means, creative features, goals and effects achieved by the present invention easy to understand, the present invention will be further described below in conjunction with specific diagrams.

An existing vehicle-mounted terminal application applied to operating vehicle regulation generally monitors single data for both regulated vehicles and drivers, can monitor only vehicle positioning data for a regulated vehicle, and can monitor only a driver continuous driving time for a vehicle driver and determine whether a driver drives in fatigue according to the monitored continuous driving time. The monitored data is only used for follow-up administrative management, and real-time control of vehicles and/or drivers cannot be performed, let alone early warning and intervention of a vehicle driving status and/or a driver status. Therefore, the practical application process has many problems and loopholes, especially the real-time and comprehensive aspects of vehicle and/or driver control.

In view of this, in the present invention, an authorized driver identity is directly determined, the driver real-time emotion, driving behavior, and fatigue status are monitored in real time during driving in an innovative manner from the perspective of driver management, the vehicle driving status is controlled in real time in a linkage manner according to the monitoring result and/or a safety warning is given to the driver, so as to give intelligent early warning of potential safety hazards that may be caused by driver factors, and the vehicle driving status can be controlled in a linkage manner, so as to eliminate potential safety hazards caused by driver factors and ensure the transportation safety of corresponding vehicles from the perspective of driver management.

On this basis, the present invention provides a vehicle safety monitoring system based on driver management. The monitoring system performs identity verification based on biometric identification technologies for authorized vehicle drivers, controls the startup permission of vehicles according to the driver identity verification result, monitors the driver face dynamic expression or face vibration amplitude and face movement and body movement posture, and pressure statuses in different areas of the seat under the driver body in real time during vehicle driving, comprehensively analyzes the driver real-time emotion status, intelligently recognizes whether the driver has abnormal behaviors that affect safe driving, cautiously determines the real-time fatigue level of the driver, automatically control the vehicle to perform automatic speed limitation, speed reduction, or emergency brake according to the emotion status, abnormal behavior monitoring, and real-time fatigue status analysis and recognition result, and sends voice prompts or sound and light warnings to effectively warn and actively intervene in potential accident risks that may be caused by driver factors. This avoids that the driver drives the vehicle in an abnormal emotion status and in a fatigue status that hinder safe driving or has abnormal behaviors that affect safe driving, ensures that the driver drives the vehicle safely in a normal emotion, mental, and physical status, and ensures that the vehicle performs active intelligent safety prevention and control when the driver has abnormal emotions, abnormal behaviors, or a fatigue status, so as to avoid transportation safety accidents of corresponding vehicles such as operating vehicles of "road passenger transport vehicles, tourist passenger transport vehicles, hazardous chemical transport vehicles, school buses, and freight vehicles".

FIG. 1 is a schematic diagram of an overall composition principle of a vehicle transportation safety monitoring system based on driver holographic management according to the present invention.

As shown in FIG. 1, the vehicle transportation safety monitoring system mainly includes a driver identity verification unit 100, a driver status monitoring unit 200, a vehicle-mounted gateway unit 300, a warning prompt unit 400, a vehicle control unit 500, and a remote management unit 600 that cooperate with each other.

As shown in FIG. 1, the driver identity verification unit 100 in this system is arranged in a cab of a vehicle 700 to be monitored, is associated with the vehicle-mounted gateway unit 300, the warning prompt unit 400, and the vehicle control unit 500 of the vehicle, and can be associated with the remote management unit 600 through the vehicle-mounted gateway unit 300.

The driver identity verification unit 100 herein can collect the current driver certificate information or biometric information, or can collect both information at the same time, which can be set according to actual needs.

The driver identity verification unit 100 can store driver identity information and corresponding biometric information.

The driver identity verification unit 100 can also store the driver identity information and corresponding biometric information in a data storage module of the vehicle-mounted gateway unit 300, or is connect to the remote management unit 600 in a wireless manner through a network communication module of the vehicle-mounted gateway unit 300, and obtains the driver identity information and the corresponding biometric information from the remote management unit.

The driver identity verification unit 100 can further compare the currently collected driver real-time identity information and corresponding biometric information with stored driver identity information and corresponding biometric information for verification, and control a working status of a vehicle starting system according to a verification result.

As an example, the vehicle 700 to be monitored herein can be operating vehicles such as "road passenger transport vehicles, tourist passenger transport vehicles, hazardous chemical transport vehicles, freight vehicles, and school buses".

Figure 2:
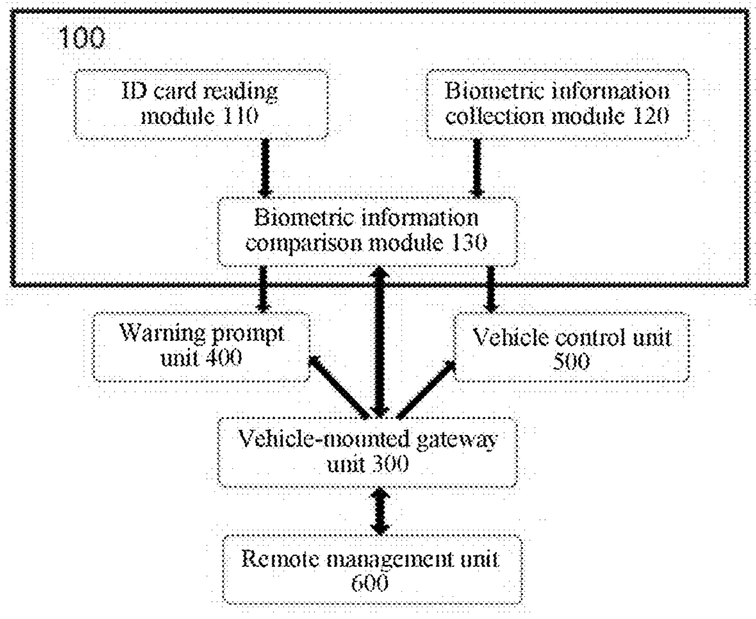
FIG. 2 is a schematic diagram of a composition principle and a usage procedure of a driver identity verification unit according to an embodiment of the present invention.

FIG. 2 is a schematic diagram of a composition principle and a usage procedure of a driver identity verification unit 100 in a vehicle transportation safety monitoring system in this embodiment.

As shown in FIG. 2, the driver identity verification unit 100 of the vehicle transportation safety monitoring system mainly includes an ID card reading module 110, a biometric information collection module 120, and a biometric information comparison module 130.

The ID card reading module 110 is configured to obtain identity information of a current driver certificate, and transmit the obtained identity information of the certificate to a biometric information comparison module 130 of the ID card reading module or a corresponding biometric information comparison functional module (for example, the corresponding edge computing module) of the vehicle-mounted gateway unit 300 or a biometric information comparison functional module of the remote management unit 600 through the vehicle-mounted gateway unit 300.

The biometric information collection module 120 is configured to obtain current driver biometric information, and transmit the obtained information to a biometric information comparison module 130 of the biometric information collection module or a corresponding biometric information comparison functional module (for example, the corresponding edge computing module) of the vehicle-mounted gateway unit 300 or a biometric information comparison functional module of the remote management unit 600 through the vehicle-mounted gateway unit 300.

The biometric information comparison module 130 is configured to compare obtained biometric information corresponding to the driver certificate identity information with current driver biometric information for verification to determine whether the information belongs to a same person.

As shown in FIG. 1 and FIG. 2, the driver identity verification unit 100 provided in this way conveniently uses the ID card reading module 110 to collect the current driver certificate information, uses the biometric information collection module 120 to collect the current driver biometric information, and uses the biometric information comparison module 130 to compare the driver certificate information collected by the identity certificate reading module 110 and the driver biometric information collected by the biometric information collection module 120 with the authorized driver identity information and corresponding biometric information stored in the biometric information comparison module 130 and/or stored in the vehicle-mounted gateway unit 300 and/or stored in the remote management unit 600 for verification.

When the biometric information comparison module 130 performs driver identity verification, the driver identity verification unit 100 forms a corresponding vehicle control instruction according to the identity verification result, for example, a vehicle startup instruction.

As an example, when the driver identity verification succeeds, the driver identity verification unit 100 can directly send the startup permission instruction information to the vehicle control unit 500, or send the startup permission instruction information to the vehicle-mounted gateway unit 300 and the vehicle-mounted gateway unit 300 forwards the startup permission instruction information to the vehicle control unit 500, so that after receiving the corresponding control instruction, the vehicle control unit 500 can turn on the vehicle ACC according to the instruction.

When the driver identity verification fails, the driver identity verification unit 100 can directly send startup forbidding instruction information to the vehicle control unit 500 and send sound and light warning information and voice prompt information to the warning prompt unit 400. As an alternative solution, startup forbidding instruction information, sound and light warning information, and voice prompt information may be sent to the vehicle-mounted gateway unit 300, and the vehicle-mounted gateway unit 300 forwards the startup forbidding instruction information to the vehicle control unit 500, and forwards the sound and light warning information and voice prompt information to the warning prompt unit 400.

In this way, the vehicle control unit 500 synchronously turns off the ACC of the vehicle after receiving the startup forbidding instruction information. At the same time, the warning prompt unit 400 synchronously sends a verification failure sound and light warning and/or voice prompt to prompt the driver to adjust the posture to re-collect biometric information and check the certificate based on the received sound and light warning information and/or voice prompt information.

After the identity verification ends, the driver identity verification unit 100 uploads the verification result and the vehicle startup status to the remote management unit 600 through the vehicle-mounted gateway 300.

It should be noted here that the driver identity verification unit 100 of the vehicle transportation safety monitoring system may not include the biometric information comparison module 130, and instead, the driver identity verification is realized by cooperating with the remote management unit 600. For example, the remote management unit 600 operates the corresponding biometric database and the comparison and recognition component, thereby realizing remote biometric information comparison.

In this case, when the driver identity verification unit 100 of the vehicle transportation safety monitoring system performs the driver identity verification, the driver identity verification unit can use the ID card reading module 110 to collect the current driver ID card information and use the biometric information collection module 120 to collect the current driver biometric information; and after completing the collection of corresponding information, upload the information to the remote management unit 600 through the vehicle-mounted gateway unit 300. The remote management unit 600 returns the verification result to the vehicle-mounted gateway unit 300 after comparing and recognizing the biometric information, and the vehicle-mounted gateway unit 300 sends instructions to the vehicle control unit 500.

In this way, when the verification succeeds, the remote management unit 600 sends a startup permission instruction to the vehicle control unit 500 through the vehicle-mounted gateway unit 300. When the verification fails, the remote management unit 600 sends a startup forbidding instruction to the vehicle control unit 500 through the vehicle-mounted gateway unit 300, sends a verification failure warning to the warning prompt unit 400 through the vehicle-mounted gateway unit 300, and prompts the driver to adjust the posture to re-collect biometric information and check the certificate.

In a special circumstance, the remote management unit 600 can send a dedicated instruction to the driver identity verification unit 100 through the vehicle-mounted gateway unit 300 to perform remote emergency authorization for the driver or turn on the ACC switch of the vehicle in an emergency.

As shown in FIG. 1, the driver status monitoring unit 200 in this system is arranged in a cab of a vehicle 700 to be monitored, is associated with the vehicle-mounted gateway unit 300, the warning prompt unit 400, and the vehicle control unit 500 of the vehicle, and is associated with the remote management unit 600 through the vehicle-mounted gateway unit 300.

The driver status monitoring unit 200 can monitor the driver emotion and/or driving behavior and/or physical fatigue status in real time, which can be transmitted to the remote management unit 600 through an edge computing module constructed by the status monitoring unit, an edge computing module of the vehicle-mounted gateway unit 300 or a network communication module of the vehicle-mounted gateway unit 300 for emotion recognition and/or behavior analysis and/or fatigue status determination. At the same time, the driver status monitoring unit 200 can obtain, according to the real-time emotion recognition result and/or the abnormal behavior analysis result and/or the fatigue status determination result, management instructions generated based on a related emotion recognition result and/or the behavior analysis result and/or the fatigue status determination result or obtain the instructions from the remote management unit through the vehicle-mounted gateway unit, is directly associated with the vehicle control unit 500 or is associated with the vehicle control unit 500 through the vehicle-mounted gateway unit 300, and controls the working status of the vehicle anti-lock brake system (ABS) module, a speed limit management module, an intelligent brake management module, or an electronic brake assist (EBA) module to perform a speed limitation, speed control, or speed reduction operation.

Figure 5:
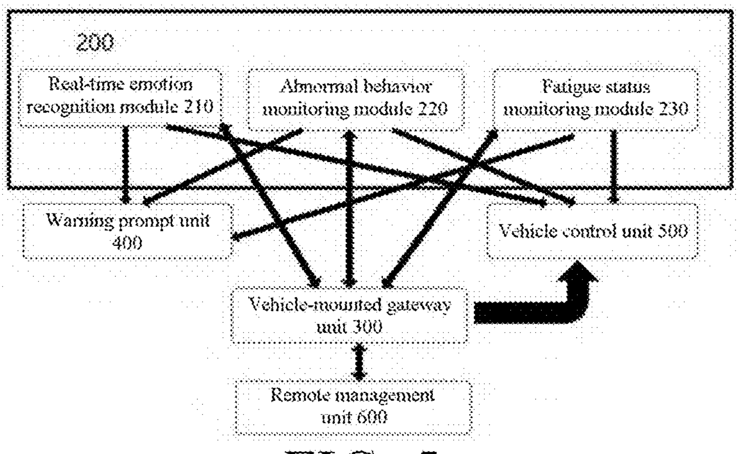
FIG. 5 is a schematic diagram of a composition principle and a usage procedure of a driver status monitoring unit according to an embodiment of the present invention.

FIG. 5 is a schematic diagram of a composition principle and a usage procedure of the driver status monitoring unit in the vehicle transportation safety monitoring system based on driver holographic management in this embodiment.

As shown in FIG. 5, the driver status monitoring unit 200 provided in this embodiment includes a real-time emotion recognition module 210 and/or an abnormal behavior monitoring module 220 and/or a fatigue status monitoring module 230 in combination with each other or independently.

The real-time emotion recognition module 210 in this unit is configured to obtain the current driver face expression dynamics, and transmit the obtained face expression dynamics to an intelligent emotion analysis module of the real-time emotion recognition module (such as the edge computing module constructed by the driver status monitoring unit 200) or an intelligent emotion analysis function module of the vehicle-mounted gateway unit (such as the edge computing module constructed by the vehicle-mounted gateway unit) or an intelligent emotion analysis function module of the remote management unit through the vehicle-mounted gateway unit.

The abnormal behavior monitoring module 220 in this unit is configured to obtain a current driver face movement or body movement, and transmit the obtained face movement or body movement to an abnormal behavior analysis functional module (such as the edge computing module constructed by the driver status monitoring unit 200) of the abnormal behavior monitoring module or an abnormal behavior analysis functional module of the vehicle-mounted gateway unit (such as the edge computing module constructed by the vehicle-mounted gateway unit) or to an abnormal behavior analysis functional module of the remote management unit through the vehicle-mounted gateway unit.

The fatigue status monitoring module 230 in this unit is configured to obtain current driver fatigue status monitoring information, and transmit the obtained information to a fatigue status determination function module (such as the edge computing module constructed by the driver status monitoring unit 200) of the fatigue status monitoring module or a fatigue status determination function module of the vehicle-mounted gateway unit (such as the edge computing module constructed by the vehicle-mounted gateway unit) or a fatigue status determination function module of the remote management unit through the vehicle-mounted gateway unit.

Herein, the solution of the edge computing module built by the driver status monitoring unit 200 is not limited, and can be determined according to actual needs. As an example, this can be implemented based on the edge computing module included in hardware of the driver status monitoring unit 200.

As shown in FIG. 1 and FIG. 5, the driver status monitoring unit 200 provided in this way can collect the current driver face expression dynamics through the real-time emotion recognition module 210 and/or perform intelligent analysis and recognition on the collected face expression dynamics to determine the current driver real-time emotion status.

The driver status monitoring unit 200 can collect the current driver head and face movement and body movement posture through the abnormal behavior monitoring module 220) and/or perform multiple intelligent analysis and recognition on the head and face movement collected by the head and face video collection device and the body movement posture collected by the body panorama video collection device, to determine whether the current driver real-time behavior status is abnormal.

The driver status monitoring unit 200 can collect the current driver face movement through the fatigue status monitoring module 230 and/or perform intelligent analysis and recognition on the head and face movements collected by the head and face video collection device, and determine the current driver real-time fatigue level. On this basis, the unit can further perform intelligent analysis and recognition by collecting the pressure distribution of different points of the seat under the driver body, to determine the current driver real-time fatigue level: or directly perform intelligent analysis and recognition on the pressure distribution of different points of the seat under the driver body collected by the seat pressure status collection device, to determine the current driver real-time fatigue level.

When the driver status monitoring unit 200 performs intelligent analysis and recognition, a corresponding edge computing module is constructed by the driver status monitoring unit 200 for intelligent analysis and recognition, such as the calculation and analysis.

As an alternative solution, a corresponding edge computing module can also be run in the vehicle-mounted gateway unit 300 to perform intelligent analysis and recognition.

As another alternative solution, intelligent analysis and recognition can also be performed in the remote management unit 600.

In this way, when the driver status monitoring unit 200 runs, the edge computing module of the driver status monitoring unit 200, or the edge computing module of the vehicle-mounted gateway unit 300, or the network communication module of the vehicle-mounted gateway unit 300 transmits the data monitored by a corresponding monitoring module to the remote management unit 600 for emotion recognition and/or behavior analysis and/or fatigue status.

At the same time, the driver status monitoring unit 200 can obtain, according to the real-time emotion recognition result and/or the abnormal behavior analysis result and/or the fatigue status determination result, management instructions generated based on a related emotion recognition result and/or behavior analysis result and/or fatigue status determination result or obtain the instructions from the remote management unit 600 through the vehicle-mounted gateway unit 300, is directly associated with the vehicle control unit 500 or is associated with the vehicle control unit 500 through the vehicle-mounted gateway unit 300, and controls the working status of the vehicle anti-lock brake system (ABS) module, a speed limit management module, an intelligent brake management module, or an electronic brake assist (EBA) module to perform a speed limitation, speed reduction, or emergent brake operation to control the vehicle running status.

As shown in FIG. 1, the vehicle-mounted gateway unit 300 in this system is arranged in the cab of the vehicle 700 to be monitored, and is associated with the driver identity verification unit 100, the driver status monitoring unit 200, the warning prompt unit 400, the vehicle control unit 500, and the remote management unit 600 of the vehicle.

The vehicle-mounted gateway unit 300 herein has at least a network communication function and/or a data storage function and/or an edge computing function and establishes a communication channel with the remote management unit 600 to compare, recognize and analyze data information generated by the driver identity verification unit and/or the driver status monitoring unit, or transmit relevant information to the remote management unit for comparison, recognition and analysis, and send, to the vehicle control unit and the warning prompt unit, management data information returned by the remote management unit.

Figure 9:
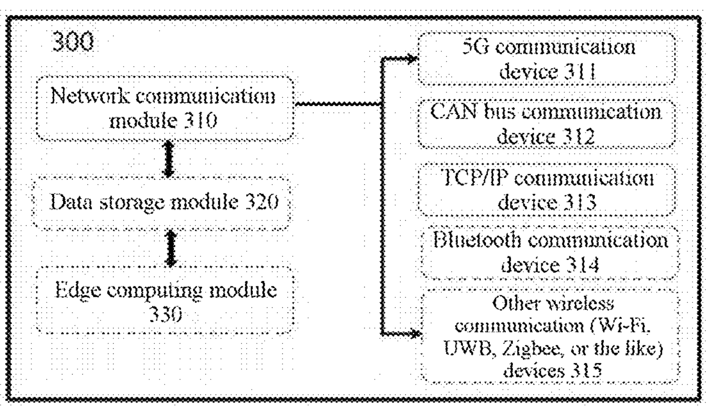
FIG. 9 is a schematic diagram of a composition principle of a vehicle-mounted gateway unit and a network communication module thereof according to an embodiment of the present invention.

FIG. 9) is a schematic diagram of a composition principle of the vehicle-mounted gateway unit 300 and a network communication module thereof in a vehicle transportation safety monitoring system based on driver holographic management according to this embodiment.

Based on FIG. 9, the vehicle-mounted gateway unit 300 applied to a vehicle transportation safety monitoring system in this embodiment includes a network communication module 310 and/or a data storage module 320 and/or an edge computing module 330 in combination or independently. The network communication module 310 is a basic component, that is, a necessary component of the vehicle-mounted gateway unit 300.

As shown in FIG. 1 and FIG. 9, the vehicle-mounted gateway unit 300 provided in this manner uses the network communication module 310 to perform data exchange between the driver identity verification unit 100 or the driver status monitoring unit 200 and the warning prompt unit 400, the vehicle control unit 500, and the remote management unit 600, forwards, to the remote management unit 600, the ID card reading data, biometric information collection data, or identity verification result information uploaded by the driver identity verification unit 100, or sends corresponding instructions to the vehicle control unit 500 and the warning prompt unit 400 according to the received driver identity verification result information.

The vehicle-mounted gateway unit 300 can use the network communication module 310) to forward, to the remote management unit 600, the current driver face expression dynamic information and/or the current driver head, face and body movement information and/or the pressure distribution information of different points of the seat under the driver body or the real-time emotion analysis and recognition result and/or abnormal behavior analysis recognition result and/or the fatigue status determination result uploaded by the driver status monitoring unit 200. Correspondingly, the vehicle-mounted gateway unit 300 can also send corresponding instructions to the vehicle control unit 500 and the warning prompt unit 400 according to the received driver real-time emotion analysis and recognition result and/or abnormal behavior analysis recognition result and/or fatigue status determination result: send corresponding instructions to the vehicle control unit 500 and the warning prompt unit 400 based on the driver identity verification result, real-time emotion analysis and recognition result and/or abnormal behavior analysis and recognition result and/or fatigue status determination result obtained by the edge computing module 330 of the vehicle-mounted gateway unit 300; or forward received management instructions of the remote management unit 600 to the driver identity verification unit 100 or the driver status monitoring unit 200 or the warning prompt unit 400 or the vehicle control unit 500.

The vehicle-mounted gateway unit 300 can use the data storage module 320 to store the ID card read data, the biometric information collection data, or the authorized driver identity information database and the biometric information database uploaded by the driver identity verification unit 100, and the current driver face expression dynamic information and/or the current driver head and face movement and body movement information and/or the pressure distribution information of different points of seat under the driver body uploaded by the driver status monitoring unit 200.

The vehicle-mounted gateway unit 300 can use the edge computing module 330 to compare, for verification, the ID card read data, the biometric information collection data, and information in the authorized driver identity information database and the biometric information database uploaded by the driver identity verification unit 100, and perform emotion intelligent analysis and recognition and/or abnormal behavior analysis and recognition and/or fatigue status analysis and determination on the current driver face expression dynamic information and/or the current driver head and face movement and body movement information and/or the pressure distribution information of different points of seat under the driver body uploaded by the driver status monitoring unit 200.

As shown in FIG. 1, the warning prompt unit 400 in this system is arranged in the cab of the vehicle 700 to be monitored, outside the vehicle, and monitoring client software of the remote management unit 600, and is associated with the driver identity verification unit 100, the driver status monitoring unit 200, the vehicle-mounted gateway unit 300, and the remote management unit 600 of the vehicle.

The warning prompt unit 400 herein includes a local sound and light warning device or a voice prompt device and a remote monitoring client warning display device. The local sound and light warning device or the voice prompt device in the warning prompt unit 400 is arranged in the cab of the vehicle and outside the vehicle, and is respectively connected with the driver identity verification unit 100, the driver status monitoring unit 200, and the vehicle-mounted gateway unit 300. The local warning prompt unit provided in this way can send a voice prompt or sound and light warning according to the driver identity verification result sent by the driver identity verification unit 100 or the vehicle-mounted gateway unit 300, and can further send a voice prompt or sound and light warning according to the driver real-time emotion status and the driving behavior analysis result sent by the driver status monitoring unit 200 or the vehicle-mounted gateway unit 300.

The remote monitoring client warning display device in the warning prompt unit 400 is arranged on the government sector management client software, enterprise operation management client software, driver and passenger service client software of the remote management unit, and is connected with the vehicle-mounted gateway unit 300. The monitoring client of the warning prompt unit provided in this way sends voice or text prompts according to the driver identity verification result or the driver status monitoring and determination result sent by the vehicle-mounted gateway unit 300.

Figure 10:
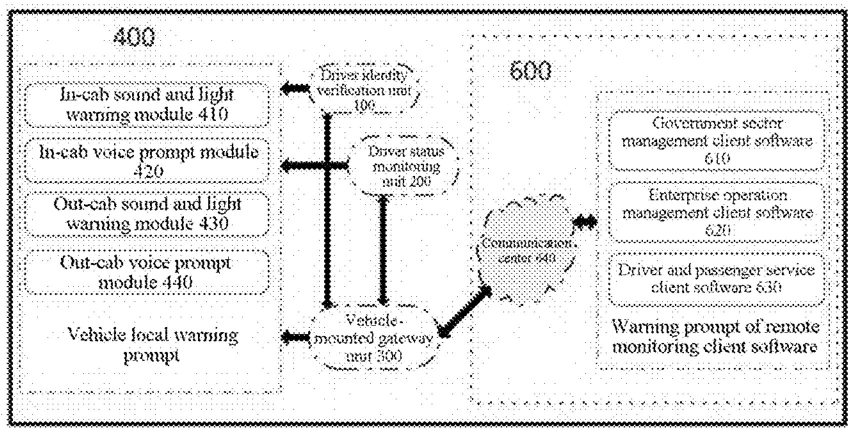
FIG. 10 is a schematic diagram of a composition principle and a usage procedure diagram of a warning prompt unit according to an embodiment of the present invention.

FIG. 10 is a schematic diagram of a composition principle and a usage procedure of the warning prompt unit 400 in the vehicle transportation safety monitoring system based on driver holographic management in this embodiment.

As shown in FIG. 10, the warning prompt unit 400 applied to a vehicle transportation safety monitoring system based on driver holographic management in this embodiment includes vehicle local warning prompt subunits and warning prompt subunits of remote monitoring client software such as government sector management client software 610, enterprise operation management client software 620, and driver and passenger service client software 630 in cooperation with each other, such as an in-cab sound and light warning module 410, an in-cab voice prompt module 420, an out-cab sound and light warning module 430, and an out-cab voice prompt module 440.

As shown in FIG. 1 and FIG. 10, the in-cab sound and light warning module 410 of the warning prompt unit 400 provided in this way is configured to send a sound and light warning when the driver identity verification fails, the driver emotion recognition result is abnormal, an abnormal behavior occurs, and the fatigue status determination result is abnormal. As an example, the light emitted by the sound and light warning device of the light warning module is generally red by default.

The in-cab voice prompt module 420 is configured to prompt the driver to start the vehicle when the driver identity verification succeeds, prompt the driver to adjust the posture for re-verification when the driver identity verification fails, prompt the driver to adjust the emotion or park nearly when the driver emotion recognition result is abnormal, prompt the driver to correct an unsafe driving behavior when the driver has an abnormal behavior, and prompt the driver to concentrate or park nearby when the fatigue status determination result is abnormal. As an example, the in-cab voice prompt module 420 and the in-cab sound and light warning module can be set independently or combined into a voice sound and light warning device.

The out-cab sound and light warning module 430 is configured to send a sound and light warning for people outside the vehicle when the driver emotion recognition result is seriously abnormal, an abnormal behavior that causes serious driving risks occurs, and the fatigue status determination result is seriously abnormal. As an example, the light emitted by the sound and light warning device of the sound and light warning module here is generally red by default, and the volume of the warning sound is enough to alert passers-by in a noisy environment on the road.

The out-cab voice prompt module 440 is configured to send a voice prompt for people outside the vehicle when the driver emotion recognition result is seriously abnormal, an abnormal behavior that causes serious driving risks occurs, and the fatigue status determination result is seriously abnormal. As an example, the volume of the voice prompt and the volume of the warning sound generated by the out-cab voice prompt module 440 are enough to cause passers-by to be highly alert in a noisy environment on the road, and the clarity of the voice broadcast of the voice warning content can be clearly understood by the listeners.

The government sector management client software 610 is configured to: when driver identity verification fails, the driver emotion recognition result is abnormal, an abnormal behavior occurs, and the fatigue status determination result is abnormal, receive the warning information forwarded by the vehicle-mounted gateway through the communication center. As an example, when the government sector management client software receives information such as serious abnormalities in the driver emotion recognition result, an abnormal behavior that causes serious driving risks, and serious abnormalities in the fatigue status determination result, the government sector management client software starts the emergency management process according to the emergency plan by default.

The enterprise operation management client software 620 is configured to: when driver identity verification fails, the driver emotion recognition result is abnormal, an abnormal behavior occurs, and the fatigue status determination result is abnormal, receive the warning information forwarded by the vehicle-mounted gateway through the communication center. As an example, when the enterprise operation management client software 620 receives information such as serious abnormalities in the driver emotion recognition result, an abnormal behavior that causes serious driving risks, and serious abnormalities in the fatigue status determination result, the enterprise operation management client software starts the emergency management process according to the emergency plan by default, and simultaneously sends emergency warning information to the government sector management client.

The driver and passenger service client 630 is configured to receive the warning information forwarded by the vehicle-mounted gateway unit through the communication center when driver identity verification fails, the driver emotion recognition result is abnormal, an abnormal behavior occurs, and the fatigue status determination result is abnormal, and send a voice prompt with preset content according to different driver and passenger service client user roles, for example, for prompting the driver to adjust the posture for re-check, for prompting the driver to adjust the emotion and correct unsafe driving behaviors or for prompting the driver to concentrate or park nearby or the like while sending the warning information. As an example, the driver and passenger service client herein sends a voice prompt while sending warning information, and the content of the voice prompt varies according to different driver and passenger service client user roles. For example, the driver service client voice prompts the driver to adjust the posture for re-verification, prompts the driver to adjust the emotion or correct an unsafe driving behavior or prompts the driver to concentrate or park nearby; and the escort service client voice of a transport vehicles for hazardous chemicals prompts the escort to supervise the driver to adjust the emotion or correct an unsafe driving behavior or prompts to supervise the driver to concentrate or park nearby or the like.

As shown in FIG. 1, the vehicle control unit 500 in this system is arranged in the cab of the vehicle 700 to be monitored, and is associated with the driver identity verification unit 100, the driver status monitoring unit 200, the vehicle-mounted gateway unit 300, and the remote management unit 600 of the vehicle.

The vehicle control unit 500 is arranged in the vehicle cab or the engine compartment of the vehicle, is linked with the starting system, the speed control system, and the braking system of the vehicle, and is associated with the vehicle-mounted gateway unit 300, the driver identity verification unit 100, and the driver status monitoring unit 200, and is associated with the warning prompt unit 400, the remote management unit 600 and/or the driver identity verification unit 100 and/or the driver status monitoring unit 200 through the vehicle-mounted gateway unit 300.

The vehicle control unit 500 can control, according to the driver identity verification result sent by the driver identity verification unit 100 or the vehicle-mounted gateway unit 300, whether the vehicle can be started.

The vehicle control unit 500 can control, according to the driver real-time emotion status analysis result and the driving behavior analysis result and the fatigue status determination result sent by the driver status monitoring unit 200 or the vehicle-mounted gateway unit 300, whether the vehicle performs speed limitation, speed reduction, or emergency braking.

Figure 11:
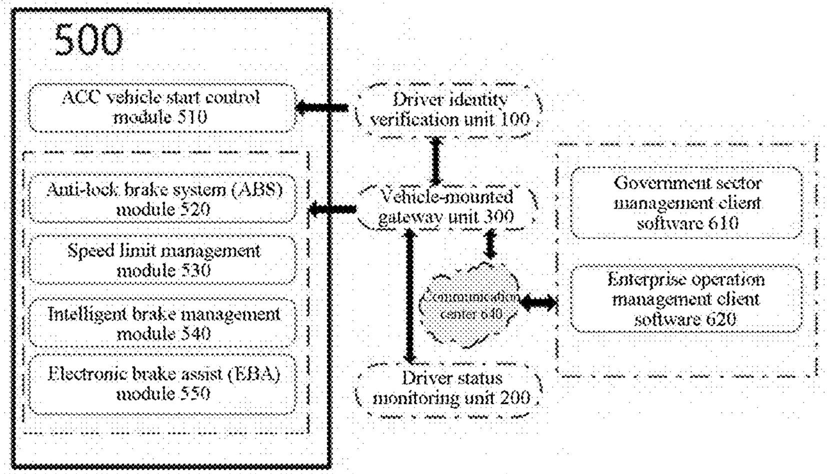
FIG. 11 is a schematic diagram of a composition principle and a usage procedure of a vehicle control unit according to an embodiment of the present invention.

FIG. 11 is a schematic diagram of a composition principle and a usage procedure of the vehicle control unit 500 in the vehicle transportation safety monitoring system based on driver holographic management in this embodiment.

Based on FIG. 11, the vehicle control unit 500 provided in this embodiment includes an ACC vehicle start control module 510 and/or an anti-lock brake system (ABS) module 520 and/or a speed limit management module 530) and/or an intelligent brake management module 540) and/or an electronic brake assist (EBA) module 550 in combination or independently.

As shown in FIG. 1 and FIG. 11, the vehicle control unit 500 provided in this way can use the ACC vehicle start control module 510 to receive the driver identity verification result sent by the driver identity verification unit 100, forwarded by the vehicle-mounted gateway unit 300 for the driver identity verification unit 100, forwarded by the communication center 640) and the vehicle-mounted gateway unit 300 for the government sector management client software 610, or forwarded by the vehicle-mounted gateway unit 300 for the enterprise operation management client software 610, and determine whether to allow a vehicle switch to turn on, where the vehicle is allowed to start when the driver identity verification result is success, and the vehicle is not allowed to start when the driver identity verification result is failure.

The vehicle control unit 500 can use the anti-lock brake system (ABS) module 520 to receive the driver status abnormality monitoring result sent by the driver status monitoring unit 200, or forwarded by the vehicle-mounted gateway unit 300 for the driver status monitoring unit 200 or forwarded by the communication center 640 and the vehicle-mounted gateway unit 300 for the enterprise operation management client software 610, and prevent the vehicle from losing control over the driving direction or skidding that may occur during emergency braking.

The vehicle control unit 500 can use the speed limit management module 530 to receive the driver status abnormality monitoring result sent by the driver status monitoring unit 200, or forwarded by the vehicle-mounted gateway unit 300 for the driver status monitoring unit 200 or forwarded by the communication center 640 and the vehicle-mounted gateway unit 300 for the enterprise operation management client software 610, and control the maximum driving speed of the vehicle.

The vehicle control unit 500 can use the intelligent brake management module 540) to receive the driver status abnormality monitoring result sent by the driver status monitoring unit 200, or forwarded by the vehicle-mounted gateway unit 300 for the driver status monitoring unit 200 or forwarded by the communication center 640) and the vehicle-mounted gateway unit 300 for the enterprise operation management client software 610, and start the intelligent braking device to reduce the real-time driving speed of the vehicle.

The vehicle control unit 500 can use the electronic brake assist (EBA) module 550 to receive the driver status abnormality monitoring result sent by the driver status monitoring unit 200, or forwarded by the vehicle-mounted gateway unit 300 for the driver status monitoring unit 200 or forwarded by the communication center 640 and the vehicle-mounted gateway unit 300 for the enterprise operation management client software 610, and quickly start all the braking force when emergency braking is required to prevent traffic accidents at an excessively long brake distance caused by the slow response of the driver under abnormal conditions.

In deployment application, the vehicle control unit 500 is preferably directly associated with driver identity verification unit 100, the driver status monitoring unit 200, and the vehicle-mounted gateway unit 300. In this way, when the vehicle control unit 500 receives a driver identity verification success result or receives a driver identity verification success result forwarded by the vehicle-mounted gateway unit 300 for the driver identity verification unit 100, the vehicle control unit 500 controls the vehicle ACC to turn on: when the vehicle control unit 500 receives a driver identity verification failure result, the vehicle control unit controls the vehicle ACC to turn off; and when the vehicle control unit 500 receives a driver status monitoring abnormal result, the vehicle control unit controls the vehicle to perform speed limitation, speed reduction, or emergency braking, to achieve precise control of different categories of vehicles in different situations, effectively ensuring vehicle driving safety.

As shown in FIG. 1, the remote management unit 600 in this system is set on a cloud platform and/or a local storage server of the relevant government industry authorities of automobile transportation and/or a personal hand-held intelligent terminal of the relevant management personnel, a cloud platform and/or a local storage server of an automobile transportation enterprise and relevant transportation parties and/or a personal hand-held intelligent terminal of the relevant management personnel, and a personal hand-held intelligent terminal of driver and passenger personnel, and is associated with the vehicle-mounted gateway unit 300, and is associated with the driver identity verification unit 100, the driver status monitoring unit 200, the warning prompt unit 400, and the vehicle control unit 500 through the vehicle-mounted gateway unit 300.

During operation, the remote management unit 600 receives the driver identity verification result and the driver status monitoring result sent by the vehicle-mounted gateway unit 300 and gives vehicle management and driver management control instructions, or receives a driver identity information collection result and a driver status monitoring information collection result sent by the vehicle-mounted gateway unit 300, compares and recognizes the identity information or consistency between the driver identity information and biometric information or related identity information and biometric and official archive database information and affiliated enterprise archive information, recognizes, analyzes, and determines a driver real-time emotion and/or an abnormal driving behavior and/or a fatigue status, gives vehicle management and driver management control instructions based on an emotion recognition result and/or an abnormal behavior analysis result and/or a fatigue status determination result, feeds back the instructions to the vehicle-mounted gateway unit 300, and feeds back the instructions to the warning prompt unit 400 or the vehicle control unit 500 through the vehicle-mounted gateway unit, to send a sound and light warning or a voice prompt or control the vehicle ACC to turn on or turn off or control the vehicle to perform speed limitation, speed reduction, or emergency braking.

Figure 12:
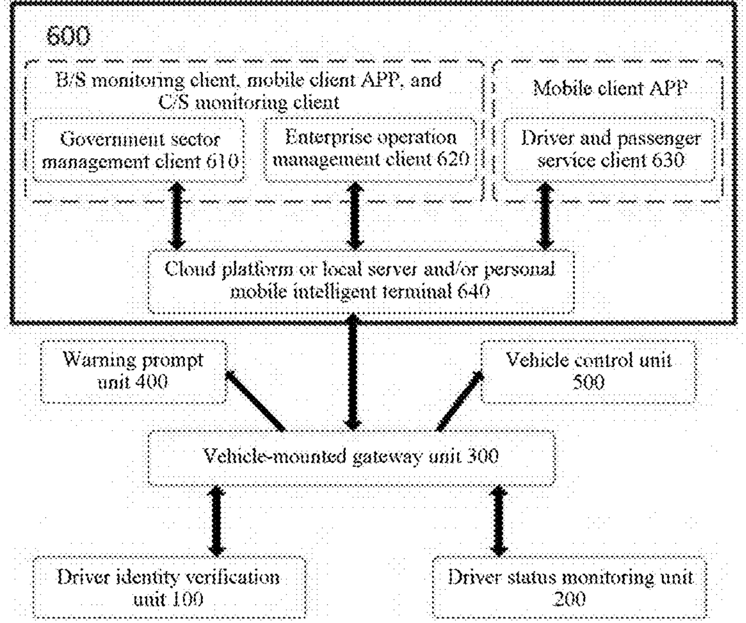
FIG. 12 is a schematic diagram of a composition principle and a usage procedure of a remote management unit according to an embodiment of the present invention.

FIG. 12 is a schematic diagram of a composition principle and a usage procedure of the remote management unit 500 in the vehicle transportation safety monitoring system based on driver holographic management in this embodiment.

As shown in FIG. 12, the remote management unit 600 in the vehicle transportation safety monitoring system based on driver holographic management in this embodiment includes government sector management client software 610, enterprise operation management client software 620, driver and passenger service client software 630, and a communication center 640) (such as a cloud platform or a local server and/or a personal mobile intelligent terminal) in cooperation with each other.

Based on FIG. 1 and FIG. 12, the remote management unit 600 provided in this way can use the government sector management client software 610 to receive and display the driver ID card collection result, the driver biometric information collection result, and the identity verification result sent by the driver identity verification unit 100 or forwarded by the vehicle-mounted gateway unit 300 and the communication center 640 for the driver identity verification unit 100, and perform supplementary content identity verification based on the driver ID card collection result and the driver biometric information collection result, and is configured to receive and display the driver status monitoring result sent by the driver status monitoring unit 200 or forwarded by the vehicle-mounted gateway unit 300 and the communication center 640 for the driver status monitoring unit 200, send relevant management instructions and manage the driver based on the received driver status monitoring result, and when the driver status monitoring result show serious abnormalities, start the emergency management process and send relevant emergency response instructions.

The remote management unit 600 can use the enterprise operation and management client software 620 to receive and display the driver ID card collection result, the driver biometric information collection result, and the identity verification result sent by the driver identity verification unit 100 or forwarded by the vehicle-mounted gateway unit 300 and the communication center 640) for the driver identity verification unit 100, and perform supplementary content identity verification based on the driver ID card collection result and the driver biometric information collection result, and is configured to receive and display the driver status monitoring result sent by the driver status monitoring unit 200 or forwarded by the vehicle-mounted gateway unit 300 and the communication center 640 for the driver status monitoring unit 200, send relevant management instructions and manage the driver based on the received driver status monitoring result, and when the driver status monitoring result show serious abnormalities, start the emergency management process, send an emergency warning to the government sector management client, and send relevant emergency response instructions.

The remote management unit 600 can use the driver and passenger service client software 630 to receive and display the identity verification result sent by the driver identity verification unit 100 or forwarded by the vehicle-mounted gateway unit 300 and the communication center 640 for the driver identity verification unit 100, send, based on the driver identity verification result, a prompt to start the vehicle or adjust the posture for re-verification, receive the driver status monitoring result sent by the driver status monitoring unit 200 or forwarded by the vehicle-mounted gateway unit 300 and the communication center 640) for the driver status monitoring unit 200, and send a relevant warning prompt according to the received driver status monitoring result.

The remote management unit 600 can use the communication center 640 to communicate with the vehicle-mounted gateway unit 300, receive and store the driver ID card collection result, the driver biometric information collection result, or the identity verification result forwarded by the vehicle-mounted gateway unit 300 for the driver identity verification unit 100, and receive and store the current driver face expression dynamic information collected by the face high-speed camera device in the real-time emotion recognition module 210 of the driver status monitoring unit 200 and forwarded by the vehicle-mounted gateway unit 300 for the driver status monitoring unit 200, the current driver head face movement and body movement posture information collected by the head and face video collection device and the body panorama video collection device in the abnormal behavior monitoring module 220, the current driver head and face movement information collected by the head and face video collection device in the fatigue status monitoring module 230, and the pressure information of different points of the seat under the driver body or the driver status monitoring result collected by the seat pressure status collection device. When the biometric information comparison component, the emotion intelligent analysis and recognition component, the abnormal behavior analysis and recognition component, the fatigue status analysis component based on video analysis, or the fatigue status analysis component based on sensor network analysis is set in the remote management unit 600, biometric information comparison, emotion intelligent analysis and recognition, abnormal behavior analysis and recognition, and fatigue status analysis and determination can be performed through the cloud platform or local server of the communication center 640).

The communication center 640 herein serves as the computer system environment for the government sector management client software 610, the enterprise operation management client software 620, and the driver and passenger service client software 630 at the same time, supports related software applications, and forwards management instructions or response instructions of the government sector management client software 610, the enterprise operation management client software 620, and the driver and passenger service client software 630 to the vehicle-mounted gateway unit 300.

On this basis, the present invention further specifies specific devices that may be involved in modules of each unit of the driving safety management system based on driver emotion and fatigue analysis.

Figure 3:
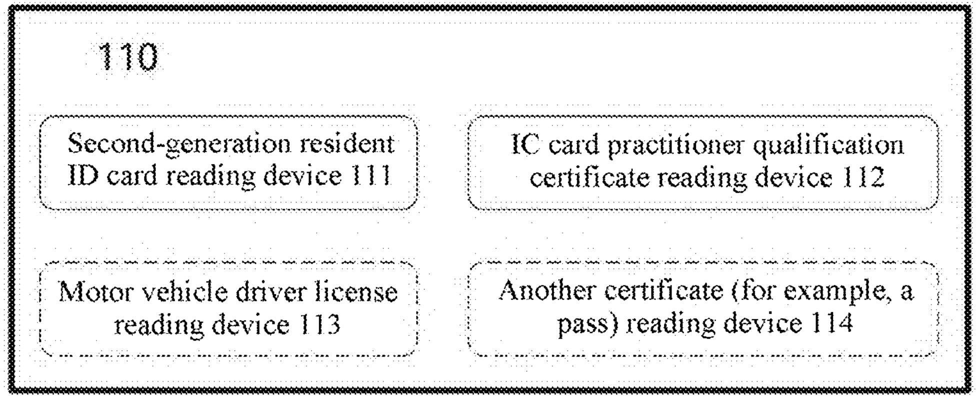
FIG. 3 is a schematic diagram of a driver identity certificate reading module of a driver identity verification unit according to an embodiment of the present invention.

FIG. 3 is a schematic diagram of a composition of the driver identity card reading module 110 in the driver identity verification unit of a vehicle transportation safety monitoring system based on driver holographic management in this embodiment.

As shown in FIG. 3, the ID card reading module 110 of the driver identity verification unit 100 applied to a vehicle transportation safety monitoring system in this embodiment includes and is not limited to a second-generation resident ID card reading device 111, an IC card practitioner qualification certificate reading device 112 and/or a motor vehicle driver license reading device 113 and/or another certificate (for example, a pass) reading device 114. The specific type of the device used is determined according to the needs of management work, and is not limited herein. Generally, there is at least the second-generation resident ID card reading device 111. For an operating vehicle for which the driver needs to hold a professional qualification certificate, there are at least the second-generation resident ID card reading device 111 and the IC card professional qualification certificate reading device 112.

According to this configuration, the ID card reading module 110 can use the second-generation ID card reading device 111 to read the driver second-generation ID card. The form of the second-generation resident ID card reading device 111 includes but is not limited to an external independent resident ID card reader, a built-in resident ID card reading module or a built-in resident ID card reading component of an intelligent terminal. The details are determined according to the installation conditions of the vehicle, and are not limited herein.

The ID card reading module 110 can use the IC card practitioner qualification certificate reading device 112 to read IC card qualification certificates of road transport practitioners of road passenger transport drivers, road dangerous goods transport practitioners, road passenger and cargo transport drivers, and some taxi drivers. The specific form of the IC card professional qualification certificate reading device 112 includes but is not limited to a radio frequency recognition (RFID) card reader for reading IC card professional qualification certificate chip information, an intelligent handheld terminal with an NFC function, a scanner for reading QR code information on the surface of the IC card professional qualification certificate, an intelligent handheld terminal with a QR code scanning function, a certificate collector for reading text information on the surface of the IC card qualification certificate, or an intelligent handheld terminal with an OCR function. The details are determined according to the installation conditions of the vehicle, and are not limited herein.

The ID card reading module 110 can use the motor vehicle driver license reading device 113 to read the motor vehicle driving license held by the driver. The form of the motor driver license reading device 113 includes but is not limited to a radio frequency recognition (RFID) card reader for reading a motor vehicle driver license with a chip, an intelligent handheld terminal with an NFC function, a scanner for reading QR code information on the surface of the motor vehicle driver license, an intelligent handheld terminal with a QR code scanning function, a certificate collector for reading text information on the surface of the motor vehicle driver license, or an intelligent handheld terminal with an OCR function. The details are determined according to the installation conditions of the vehicle, and are not limited herein.

The ID card reading module 110 uses the another certificate (such as pass) reading device 114 to read the pass and other certificates held by the driver. The form of the another certificate (such as, a pass) reading device 114 is determined based on a certificate to be read, and includes but is not limited to a radio frequency recognition (RFID) card reader for reading a certificate with a chip, an intelligent handheld terminal with an NFC function, a scanner for reading QR code information on the surface of the certificate, an intelligent handheld terminal with a QR code scanning function, a certificate collector for reading text information on the surface of the certificate, or an intelligent handheld terminal with an OCR function. The details are determined according to the installation conditions of the vehicle, and are not limited herein.

Figure 4:
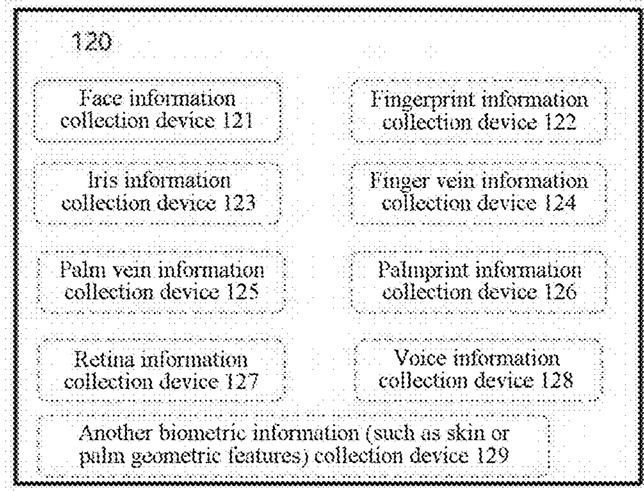
FIG. 4 is a schematic diagram of a biometric information collection module of a driver identity verification unit according to an embodiment of the present invention.

FIG. 4 is a schematic diagram of a composition of the biometric information collection module 120 in the driver identity verification unit applied to a vehicle transportation safety monitoring system in this embodiment.

As shown in FIG. 4, the biometric information collection module 120 in the driver identity verification unit 100 applied to a vehicle transportation safety monitoring system in this embodiment includes but is not limited to a face information collection device 121, a fingerprint information collection device 122, an iris information collection device 123, a finger vein information collection device 124, a palm vein information collection device 125, a palmprint information collection device 126, a retina information collection device 127, and a voice information collection device 128, or another biometric information collection device (such as skin or palm geometric features) 129. Specifically, this is determined according to the requirements of relevant government industry authorities, and is not limited herein, but it is preferable to use non-contact biometric collection manners such as the face information collection device 121, the iris information collection device 123, the retina information collection device 127, and the voice information collection device 128.

The biometric information collection module 120 can use the face information collection device 121 to collect the driver front face information. A specific form of the face information collection device 121 includes but is not limited to an external video collection camera and a built-in video collection camera. A specific type of the face information collection device includes but is not limited to a visible light video collection camera, a near-infrared video collection camera, and a dedicated camera or a 3D face collector for collecting 3D face information. The details are determined according to vehicle installation conditions and carrier management requirements, and are not limited herein.

The biometric information collection module 120 can use the fingerprint information collection device 122 to collect the driver fingerprint information. A form of the fingerprint information collection device 122 includes but is not limited to an external fingerprint collector and a built-in fingerprint collection component. A specific type of the fingerprint information collection device includes but is not limited to an optical fingerprint collector, a thermal fingerprint collector, and a biological radio frequency fingerprint collector. The details are determined according to vehicle installation conditions and carrier management requirements, and are not limited herein.

The biometric information collection module 120 can use the iris information collection device 123 to collect the driver iris information. A specific form of the iris information collection device 123 includes but is not limited to an external iris collector and a built-in iris collector. A type of the iris information collection device includes but is not limited to a monocular iris collector (device) and a binocular iris collector (device). The details are determined according to vehicle installation conditions and carrier management requirements, and are not limited herein.

The biometric information collection module 120 can use the finger vein information collection device 124 to collect the driver finger vein information. A specific form of the finger vein information collection device 124 includes but is not limited to an external finger vein pattern collector and a built-in finger vein collection component. A type of the finger vein information collection device includes but is not limited to a single finger vein collector and a finger vein plus fingerprint composite collector. The details are determined according to vehicle installation conditions and carrier management requirements, and are not limited herein.

The biometric information collection module 120 can use the palm vein information collection device 125 to collect palm vein information of the driver. A specific form of the palm vein information collection device 125 includes but is not limited to an external desktop palm vein collector, an external handheld palm vein collector, a built-in palm vein collection component. A type of the palm vein information collection device includes but is not limited to a single palm vein collector and a palm vein plus palmprint composite collector. The details are determined according to vehicle installation conditions and carrier management requirements, and are not limited herein.

The biometric information collection module 120 can use the palmprint information collection device 126 to collect the driver palmprint information. A specific form of the palmprint information collection device 126 includes but is not limited to an external desktop palmprint collector, an external handheld palmprint collector, and a built-in palmprint collection component. A type of the palmprint information collection device includes but is not limited to a single palmprint collector and a palmprint plus palm vein composite collector. The details are determined according to vehicle installation conditions and carrier management requirements, and are not limited herein.

The biometric information collection module 120 can use the retina information collection device 127 to collect retina information of the driver. A specific form of the retina information collection device 127 includes but is not limited to an external retina collector and a built-in retina collector. A type of the retina information collection device includes but is not limited to a monocular retina collector (device) and a binocular retina collector (device). The details are determined according to vehicle installation conditions and carrier management requirements, and are not limited herein.

The biometric information collection module 120 can use the voice information collection device 128 to collect the driver voice information. A specific form of the sound information collection device 128 includes but is not limited to an external sound collector and a built-in sound collector. A type of the sound information collection device includes but is not limited to a megaphone, a microphone, and a pickup. The details are determined according to vehicle installation conditions and carrier management requirements, and are not limited herein.

The biometric information collection module 120 can use the another biometric information (such as skin and palm geometric features) collection device 129 to collect other biometric information such as driver internal skin biometric information and palm and finger physical feature information. A specific form of the another biometric information (such as skin and palm geometric features) collection device 129 includes but is not limited to an external another biometric information (such as skin and palm geometric features) collector and a built-in another biometric information (such as skin and palm geometric features) collector. Further, a type of the another biometric information (such as skin and palm geometric features) collection device includes but is not limited to a skin photoprint collector and a hand shape reader. The details are determined according to vehicle installation conditions and carrier management requirements, and are not limited herein.

Correspondingly, the biometric information comparison module 130 of the driver identity verification unit in this embodiment specifically includes and is not limited to a face information comparison device, a fingerprint information comparison device, an iris information comparison device, a finger vein information comparison device, a palm vein information comparison device, a palmprint information comparison device, a retina information comparison device, and a voice information comparison device, or another biometric information comparison device (such as skin or palm geometric features).

The face information comparison device herein is configured to perform 1:1 comparison verification on face digital images and/or surface face images in a chip of a read ID card or other certificates and driver face image information collected on site, perform 1:1 comparison verification on driver face image information collected on site and face information corresponding to a read identity in a database and/or perform 1:N comparison verification on driver face image information collected on site and face information of all authorized drivers in the database.

A form of the face information comparison device includes but is not limited to a built-in authorized person face database and comparison recognition component in the identity verification unit, an authorized person face database and comparison recognition component in the vehicle-mounted gateway unit, and an authorized person face database and comparison recognition component in the remote management unit. The details are determined according to vehicle installation conditions and carrier management requirements, and are not limited herein.

The fingerprint information comparison device herein is configured to perform 1:1 comparison verification on fingerprint information in a chip of a read ID card or other certificates and driver fingerprint information collected on site, perform 1:1 comparison verification on driver fingerprint information collected on site and fingerprint information corresponding to a read identity in a database and/or perform 1:N comparison verification on driver fingerprint information collected on site and fingerprint information of all authorized drivers in the database.

A form of the fingerprint information comparison device includes but is not limited to a built-in authorized person fingerprint database and comparison recognition component in the identity verification unit, an authorized person fingerprint database and comparison recognition component in the vehicle-mounted gateway unit, and an authorized person fingerprint database and comparison recognition component in the remote management unit. The details are determined according to vehicle installation conditions and carrier management requirements, and are not limited herein.

The iris information comparison device herein is configured to perform 1:1 comparison verification on iris information (if exist) in a chip of a read ID card or other certificates and driver iris information collected on site, and/or perform 1:1 comparison verification on driver iris information collected on site and iris information corresponding to a read identity in a database and/or perform 1:N comparison verification on driver iris information collected on site and iris information of all authorized drivers in the database.

A form of the iris information comparison device includes but is not limited to a built-in authorized person iris database and comparison recognition component in the identity verification unit, an authorized person iris database and comparison recognition component in the vehicle-mounted gateway unit, and an authorized person iris database and comparison recognition component in the remote management unit. The details are determined according to vehicle installation conditions and carrier management requirements, and are not limited herein.

The finger vein information comparison device herein is configured to perform 1:1 comparison verification on finger vein information (if exist) in a chip of a read ID card or other certificates and driver finger vein information collected on site, and/or perform 1:1 comparison verification on driver finger vein information collected on site and finger vein information corresponding to a read identity in a database and/or perform 1:N comparison verification on driver finger vein information collected on site and finger vein information of all authorized drivers in the database. A form of the finger vein information comparison device includes but is not limited to a built-in authorized person finger vein database and comparison recognition component in the identity verification unit, an authorized person finger vein database and comparison recognition component in the vehicle-mounted gateway unit, and an authorized person finger vein database and comparison recognition component in the remote management unit. The details are determined according to vehicle installation conditions and carrier management requirements, and are not limited herein.

The palm vein information comparison device herein is configured to perform 1:1 comparison verification on palm vein information (if exist) in a chip of a read ID card or other certificates and driver palm vein information collected on site, and/or perform 1:1 comparison verification on driver palm vein information collected on site and palm vein information corresponding to a read identity in a database and/or perform 1:N comparison verification on driver palm vein information collected on site and palm vein information of all authorized drivers in the database. A form of the palm vein information comparison device includes but is not limited to a built-in authorized person palm vein database and comparison recognition component in the identity verification unit, an authorized person palm vein database and comparison recognition component in the vehicle-mounted gateway unit, and an authorized person palm vein database and comparison recognition component in the remote management unit. The details are determined according to vehicle installation conditions and carrier management requirements, and are not limited herein.

The palmprint information comparison device herein is configured to perform 1:1 comparison verification on palmprint information (if exist) in a chip of a read ID card or other certificates and driver palmprint information collected on site, and/or perform 1:1 comparison verification on driver palmprint information collected on site and palmprint information corresponding to a read identity in a database and/or perform 1:N comparison verification on driver palmprint information collected on site and palmprint information of all authorized drivers in the database.

A form of the palmprint information comparison device includes but is not limited to a built-in authorized person palmprint database and comparison recognition component in the identity verification unit, an authorized person palmprint database and comparison recognition component in the vehicle-mounted gateway unit, and an authorized person palmprint database and comparison recognition component in the remote management unit. The details are determined according to vehicle installation conditions and carrier management requirements, and are not limited herein.

The retina information comparison device herein is configured to perform 1:1 comparison verification on retina information (if exist) in a chip of a read ID card or other certificates and driver retina information collected on site, and/or perform 1:1 comparison verification on driver retina information collected on site and retina information corresponding to a read identity in a database and/or perform 1:N comparison verification on driver retina information collected on site and retina information of all authorized drivers in the database.

A form of the retina information comparison device includes but is not limited to a built-in authorized person retina database and comparison recognition component in the identity verification unit, an authorized person retina database and comparison recognition component in the vehicle-mounted gateway unit, and an authorized person retina database and comparison recognition component in the remote management unit. The details are determined according to vehicle installation conditions and carrier management requirements, and are not limited herein.

The sound information comparison device herein is configured to perform 1:1 comparison verification on sound information features (if exist) in a chip of a read ID card or other certificates and driver sound information features collected on site, and/or perform 1:1 comparison verification on driver sound information features collected on site and sound information features corresponding to a read identity in a database and/or perform 1:N comparison verification on driver sound information features collected on site and sound information features of all authorized drivers in the database.

A form of the sound information comparison device includes but is not limited to a built-in authorized person sound feature database and comparison recognition component in the identity verification unit, an authorized person sound feature database and comparison recognition component in the vehicle-mounted gateway unit, and an authorized person sound feature database and comparison recognition component in the remote management unit. The details are determined according to vehicle installation conditions and carrier management requirements, and are not limited herein.

The another biometric information (such as skin and palm geometric features) comparison device herein is configured to perform 1:1 comparison verification on another biometric information (such as skin and palm geometric features) (if exist) in a chip of a read ID card or other certificates and another driver biometric information (such as skin and palm geometric features) collected on site, and/or perform 1:1 comparison verification on another driver biometric information (such as skin and palm geometric features) collected on site and another biometric information (such as skin and palm geometric features) corresponding to a read identity in a database and/or perform 1:N comparison verification on another driver biometric information (such as skin and palm geometric features) collected on site and another biometric information (such as skin and palm geometric features) of all authorized drivers in the database.

A form of the another biometric information (such as skin and palm geometric features) comparison device includes but is not limited to a built-in authorized person another biometric (such as skin and palm geometric features) database and comparison recognition component in the identity verification unit, an authorized person another biometric (such as skin and palm geometric features) database and comparison recognition component in the vehicle-mounted gateway unit, and an authorized person another biometric (such as skin and palm geometric features) database and comparison recognition component in the remote management unit. The details are determined according to vehicle installation conditions and carrier management requirements, and are not limited herein.

Based on this, the driver identity verification unit 100 including the ID card reading module 110, the biometric information collection module 120 and the biometric information comparison module 130 in cooperation with each other can be directly associated with the vehicle control unit or indirectly associated with the vehicle control unit and/or the remote management unit through the vehicle-mounted gateway when being deployed.

When the driver identity verification unit 110 is directly associated with the vehicle control unit 500, the ACC switch of the vehicle can be turned on normally after the driver identity verification succeeds: otherwise, the ACC switch of the vehicle cannot be turned on normally, the warning prompt unit 400 sends a verification failure warning to prompt the driver to adjust the posture and re-collect biometrics, and a verification result and a vehicle startup status are uploaded to the remote management unit 600 through the vehicle-mounted gateway unit 300.

When the driver identity verification unit 110 is indirectly associated with the vehicle control unit 500 through the vehicle-mounted gateway unit 300, the vehicle-mounted gateway unit 300 sends instructions to the vehicle control unit 500 after the driver identity verification result is generated, after the verification succeeds, the ACC switch of the vehicle can be turned on normally: otherwise, the ACC switch of the vehicle cannot be turned on normally, the warning prompt unit 400 sends a verification failure warning to prompt the driver to adjust the posture and re-collect biometrics, and the verification result and vehicle startup status are uploaded to the remote management unit 600 through the vehicle-mounted gateway unit 300.

When the driver identity verification unit 110 is indirectly associated with the vehicle control unit 500 through the vehicle-mounted gateway unit 300, but the biometric database and the comparison and recognition component are in the remote management unit, the driver ID card reading information and biometric collection information are uploaded to the remote management unit 600 through the vehicle-mounted gateway unit 300, the remote management unit 600 performs biometric information comparison and recognition, and then sends the verification result back to the vehicle-mounted gateway unit 300, the vehicle-mounted gateway unit 300 sends instructions to the vehicle control unit 500, after the verification succeeds, the ACC switch of the vehicle can be turned on normally: otherwise, the ACC switch of the vehicle cannot be turned on normally, the warning prompt unit 400 sends a verification failure warning to prompt the driver to adjust the posture and re-collect biometrics, and the vehicle startup status is uploaded to the remote management unit 600 through the vehicle-mounted gateway unit 300.

Under special conditions, the driver identity verification unit 110 supports remote emergency authorization through the remote management unit.

Figure 6:
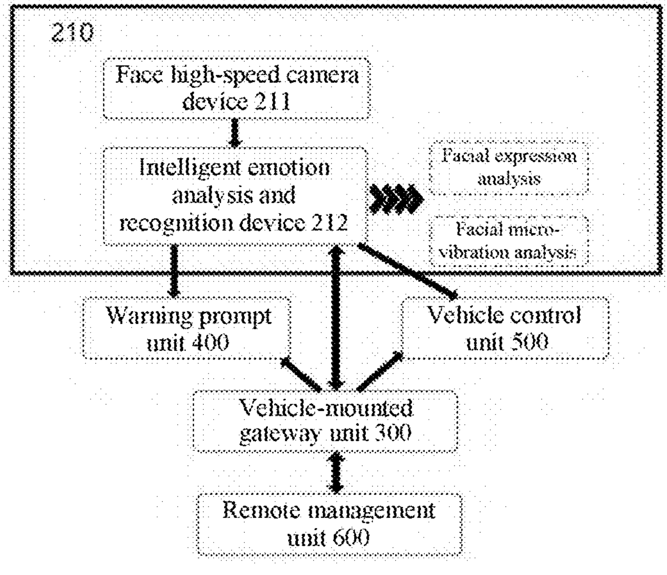
FIG. 6 is a schematic diagram of a composition principle and a usage procedure of an emotion recognition module of a driver status monitoring unit according to an embodiment of the present invention.

FIG. 6 is a schematic diagram of a composition principle and a usage procedure of the real-time emotion recognition module 210 in the driver status monitoring unit 200 applied to a vehicle transportation safety monitoring system in this embodiment.

As shown in FIG. 6, the real-time emotion recognition module 210 in the driver status monitoring unit 200 applied to a vehicle transportation safety monitoring system in this embodiment includes a face high-speed camera device 211 and an intelligent emotion analysis and recognition device 212.

The face high-speed camera device 211 herein is configured to collect the current driver face expression dynamics. The face high-speed camera device 211 includes, but is not limited to, an external high-speed video capturing camera and a built-in high-speed video capturing camera. The types of the face high-speed camera device include but are not limited to a visible light high-speed video capturing camera, a near-infrared high-speed video capturing camera, a special high-speed camera for capturing 3D face expression dynamics or a 3D face high-speed expression dynamic capturing instrument; and are determined according to vehicle installation conditions and carrier management requirements, and are not limited herein.

The emotion intelligent analysis and recognition device 212 herein is configured to perform intelligent analysis and recognition on the face expression dynamics collected by the face high-speed camera device 211, and determine a current driver real-time emotion status. The form of the emotion intelligent analysis and recognition device includes but is not limited to an emotion intelligent analysis and recognition component built in the driver status monitoring unit, an emotion intelligent analysis and recognition component in the vehicle-mounted gateway unit, and an emotion intelligent analysis and recognition component in the remote management unit. Furthermore, the type of the emotion intelligent analysis and recognition device includes but is not limited to face expression analysis, micro-expression analysis, and face micro-vibration analysis according to different technical principles. The details are determined according to vehicle installation conditions and carrier management requirements, and are not limited herein.

Figure 7:
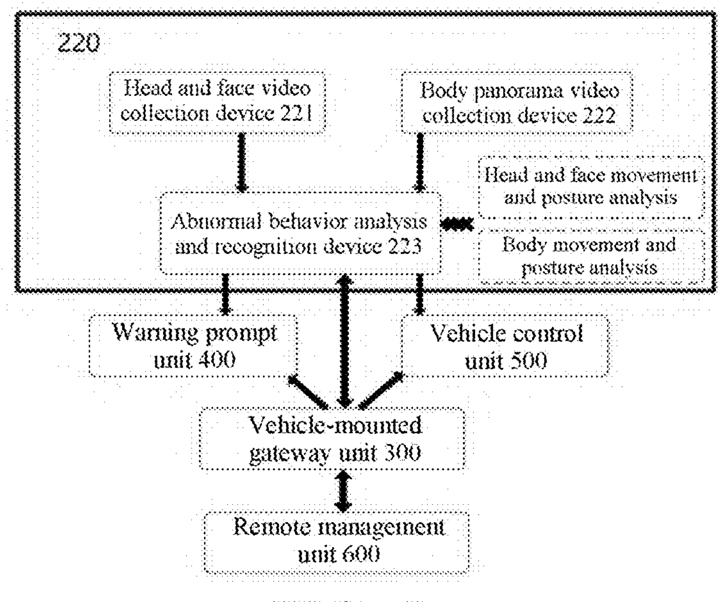
FIG. 7 is a schematic diagram of a composition principle and a usage procedure of an abnormal behavior recognition module of a driver status monitoring unit according to an embodiment of the present invention.

FIG. 7 is a schematic diagram of a composition principle and a usage procedure of the abnormal behavior monitoring module 220 in the driver status monitoring unit 200 applied to a vehicle transportation safety monitoring system in this embodiment.

Based on shown in FIG. 7, the abnormal behavior monitoring module 220 in the driver status monitoring unit 200 applied to a vehicle transportation safety monitoring system in this embodiment includes a head and face video collection device 221, a body panorama video collection device 222, and an abnormal behavior analysis and recognition device 223.

The head and face video collection device 221 is configured to collect current driver head and face movements. The head and face video collection device 221 includes but is not limited to an external video collection camera and a built-in video collection camera; and the type of the head and face video collection device 221 includes but is not limited to a visible light video collection camera and a near-infrared video collection camera: which are determined based on vehicle installation conditions and carrier management requirements, and are not limited herein.

The body panorama video collection device 222 is configured to collect a current driver body movement posture. The body panorama video collection device 222 includes but is not limited to an external video collection camera and a built-in video collection camera; and the type of the body panorama video collection device includes but is not limited to a visible light video collection camera and an infrared video collection camera: which are determined based on vehicle installation conditions and carrier management requirements, and are not limited herein.

The abnormal behavior analysis and recognition device 223 is configured to perform intelligent analysis and recognition on the head and face movement collected by the head and face video collection device 221 and the body movement posture collected by the body panorama video collection device 222, to determine whether a current driver real-time behavior status is abnormal. The abnormal behavior analysis and recognition device 223 includes but is not limited to an abnormal behavior analysis and recognition component built in the driver status monitoring unit, an abnormal behavior analysis and recognition component in the vehicle-mounted gateway unit, and an abnormal behavior analysis and recognition component in the remote management unit. Besides, the type of the abnormal behavior analysis and recognition device includes head and face movement analysis or body movement and posture analysis. The details are determined according to vehicle installation conditions and carrier management requirements, and are not limited herein.

Figure 8:
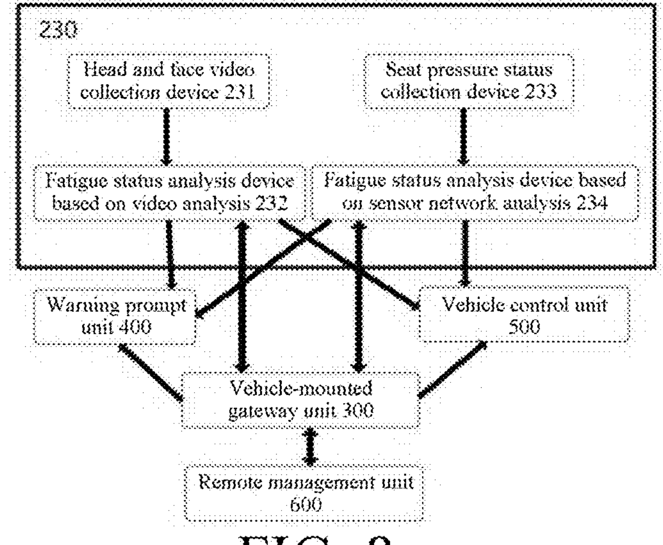
FIG. 8 is a schematic diagram of a composition principle and a usage procedure of a fatigue status monitoring module of a driver status monitoring unit according to an embodiment of the present invention.

FIG. 8 is a schematic diagram of a composition principle and a usage procedure of the fatigue status monitoring module 230 in the driver status monitoring unit 200 applied to a vehicle transportation safety monitoring system in this embodiment.

As shown in FIG. 8, the fatigue status monitoring module 230 in the driver status monitoring unit 200 applied to a vehicle transportation safety monitoring system in this embodiment includes a head and face video collection device 231, a fatigue status analysis device 232 based on video analysis, a seat pressure status collection device 233, and a fatigue status analysis device 234 based on sensor network analysis.

The head and face video collection device 231 is configured to collect current driver head and face movements. The head and face video collection device includes but is not limited to an external video collection camera and a built-in video collection camera; and the type of the head and face video collection device includes but is not limited to a visible light video collection camera and a near-infrared video collection camera: which are determined based on vehicle installation conditions and carrier management requirements, and are not limited herein.

Herein, the fatigue status analysis device 232 based on video analysis is configured to intelligently analyze and recognize the head and face movements collected by the head and face video collection device 231 and determine current driver real-time fatigue. The fatigue status analysis device based on video analysis includes but is not limited to a fatigue status analysis component based on video analysis built in the driver status monitoring unit, a fatigue status analysis component based on video analysis in the vehicle-mounted gateway unit, and a fatigue status analysis component based on video analysis in the remote management unit. The details are determined according to vehicle installation conditions and carrier management requirements, and are not limited herein.

Herein, the seat pressure status collection device 233 is configured to collect pressure distribution of different points of a seat under the driver body. The seat pressure status collection device includes but is not limited to an external seat cushion laid on the seat, a pressure sensor on the backrest, and a built-in pressure sensor built in the seat. The type of the seat pressure status collection device includes but is not limited to piezoelectric sensors, piezoresistive sensors, and strain gauge sensors based on different technical principles. The details are determined according to vehicle installation conditions and carrier management requirements, and are not limited herein.

Herein, the fatigue status analysis device 234 based on sensor network analysis is configured to intelligently analyze and recognize the pressure distribution of the different points of the seat under the driver body collected by the seat pressure status collection device 233, and determine the current driver real-time fatigue. The fatigue status analysis device 234 based on sensor network analysis includes but is not limited to a fatigue status analysis component based on sensor network analysis built in the driver status monitoring unit, a fatigue status analysis component based on sensor network analysis in the vehicle-mounted gateway unit, and a fatigue status analysis component based on sensor network analysis in the remote management unit. The details are determined according to vehicle installation conditions and carrier management requirements, and are not limited herein.

Based on this, the driver status monitoring unit 200 including the real-time emotion recognition module 210, the abnormal behavior monitoring module 220, and the fatigue status monitoring module 230) can be directly associated with the vehicle control unit 500 or indirectly associated with the vehicle control unit 500 and/or the remote management unit 600 through the vehicle-mounted gateway unit 300 when deployed.

When the driver status monitoring unit 200 is directly associated with the vehicle control unit 500, and the driver real-time emotion recognition result and/or the abnormal behavior monitoring result and/or the fatigue status monitoring result reaches or exceeds a danger threshold, the vehicle control unit 500 controls the speed limitation, speed reduction or emergency braking of the vehicle, and the warning prompt unit sends a dangerous status or behavior warning prompt, and an analysis and recognition or determination result and an action status of the vehicle control unit are uploaded to the remote management unit 600 through the vehicle-mounted gateway unit 300.

After the driver status monitoring unit 200 is indirectly associated with the vehicle control unit 500 through the vehicle-mounted gateway unit 300, and the driver real-time emotion recognition result and/or the abnormal behavior monitoring result and/or the fatigue status monitoring result reaches or exceeds a danger threshold, the vehicle-mounted gateway unit 300 sends an instruction to the vehicle control unit 500, the vehicle control unit 500 controls the speed limitation, speed reduction or emergency braking of the vehicle, and the warning prompt unit sends a dangerous status or behavior warning prompt, and an analysis and recognition or determination result and an action status of the vehicle control unit 500 are uploaded to the remote management unit 600 through the vehicle-mounted gateway unit 300.

When the driver status monitoring unit 200 is indirectly associated with the vehicle control unit 500 through the vehicle-mounted gateway unit 300, but the fatigue status analysis component based on video analysis or the fatigue status analysis component based on sensor network analysis is in the remote management unit 600, the current driver face expression dynamic information collected by the face high-speed camera device in the real-time emotion recognition module 210 in the driver status monitoring unit 200, the current driver head and face movement and body movement posture information collected by the head and face video collection device and the body panorama video collection device in the abnormal behavior monitoring module 220, the current driver head and face movement information collected by the head and face video collection device in the fatigue status monitoring module 230, and the pressure information of different points of the seat under the driver body collected by the seat pressure status collection device are uploaded to the remote management unit 600 through the vehicle-mounted gateway unit 300. The remote management unit 600 performs intelligent analysis, recognition, or determining and then returns the analysis and recognition or determination result to the vehicle-mounted gateway unit 300, and the vehicle-mounted gateway unit 300 sends instructions to the vehicle control unit 500; the vehicle control unit 500 controls speed limitation, speed reduction, or emergency braking of the vehicle, the warning prompt unit 400 sends a dangerous status or behavior warning prompt, and the action status of the vehicle control unit 500 is uploaded to the remote management unit through the vehicle-mounted gateway.

FIG. 9) is a schematic diagram of a composition principle of the vehicle-mounted gateway unit 300 and a network communication module thereof in a vehicle transportation safety monitoring system based on driver holographic management according to this embodiment.

Based on FIG. 9, the network communication module 310 in the vehicle-mounted gateway unit 300 applied to a vehicle transportation safety monitoring system in this embodiment includes a 5G communication device 311, a CAN bus communication device 312, a TCP/IP communication device 313, a Bluetooth (Bluetooth) communication device 314, and other wireless communication (Wi-Fi, UWB, Zigbee, or the like) devices 315.

The network communication module 310 can use the 5G communication device 311 to perform communication between the vehicle-mounted gateway unit 300 and the remote management unit 600.

The network communication module 310 can use the CAN bus communication device 312 to implement CAN bus wired communication between the vehicle-mounted gateway unit 300 and the driver identity verification unit 100, the driver status monitoring unit 200, the warning prompt unit 400, and the vehicle control unit 500.

The network communication module 310 can use the TCP/IP communication device 313 to implement TCP/IP wired communication or wireless communication between the vehicle-mounted gateway unit 300 and the driver identity verification unit 100, the driver status monitoring unit 200, the warning prompt unit 400, the vehicle control unit 500, and the remote management unit 600.

The network communication module 310 can use the Bluetooth (Bluetooth) communication device 314 to implement wireless communication based on the Bluetooth (Bluetooth) protocol between the vehicle-mounted gateway unit 300 and the driver identity verification unit 100, the driver status monitoring unit 200, and the warning prompt unit 400.

The network communication module 310 can use other wireless communication (Wi-Fi, UWB. Zigbee, or the like) devices 314 to implement wireless communication based on corresponding protocols such as Wi-Fi, UWB, and Zigbee between the vehicle-mounted gateway unit 300 and the driver identity verification unit 100, the driver status monitoring unit 200, and the warning prompt unit 400.

As a preferred solution, the network communication module 310 in this embodiment has at least three communication devices such as the 5G communication device 311, the CAN bus communication device 312, and the TCP/IP communication device 313, and configuration of other wireless communication devices is determined according to a specific communication mode of a camera, a sensor, a certificate collection device, and a biometric collection device installed on the vehicle, which is not limited herein.

Based on FIG. 9, the data storage module 320 in the vehicle-mounted gateway unit 300 applied to a vehicle transportation safety monitoring system in this embodiment includes a built-in data storage device and an external data storage device.

The built-in data storage device is configured to store the ID card read data, the biometric information collection data, or the authorized driver identity information database and the biometric information database uploaded by the driver identity verification unit, and the current driver face expression dynamic information and/or the current driver head and face movement and body movement information and/or the pressure distribution information of different points of seat under the driver body uploaded by the driver status monitoring unit. The built-in data storage device specifically includes, but is not limited to, a built-in static random access memory SRAM, a built-in dynamic random access memory DRAM, a built-in hard disk, and a built-in read-only memory ROM. The built-in read-only memory ROM is configured to store the authorized driver identity information database and biometric information database.

The external data storage device herein includes but is not limited to an external mobile hard disk, a USB flash drive, a TF memory card, an SD memory card, an erasable CD-RW, a DVD-RAM disc, and non-erasable CD-ROM and DVD-ROM discs. The non-erasable CD-ROM and DVD-ROM discs are configured to store the authorized driver identity information database and biometric information database.

As shown in FIG. 9, the edge computing module 330 in the vehicle-mounted gateway unit 300 applied to a vehicle transportation safety monitoring system in this embodiment includes an AI intelligent chip with an edge computing function and a terminal SDK with edge computing.

The circuit board AI intelligent chip with an edge computing function and the terminal SDK with edge computing are configured to compare, for verification, the ID card read data, the biometric information collection data, and information in the authorized driver identity information database and the biometric information database uploaded by the driver identity verification unit, and perform emotion intelligent analysis and recognition and/or abnormal behavior analysis and recognition and/or fatigue status analysis and determination on the current driver face expression dynamic information and/or the current driver head and face movement and body movement information and/or the pressure distribution information of different points of seat under the driver body uploaded by the driver status monitoring unit.

According to this, the vehicle-mounted gateway unit 300 jointly formed by the network communication module 310, the data storage module 320, and the edge computing module 330 can be directly associated with the driver identity verification unit 100, the driver status monitoring unit 200, the vehicle control unit 500, the warning prompt unit 400 and the remote management unit 600 in specific deployment.

When the vehicle-mounted gateway unit 300 receives the driver identity verification result, the vehicle-mounted gateway unit 300 sends an instruction to the vehicle control unit 500 to control the vehicle ACC to turn on, and forwards the driver identity verification result and action information of the vehicle control unit to the remote management unit 600.

When the vehicle-mounted gateway unit 300 receives the driver identity verification failure result, the vehicle-mounted gateway unit 300 sends an instruction to the vehicle control unit 500 to control the vehicle ACC to turn off, sends an instruction to the warning prompt unit 400 to prompt the driver to adjust the posture for re-verification, and forwards the driver identity verification result and action information of the vehicle control unit to the remote management unit 600.

When the vehicle-mounted gateway unit 300 receives the driver status monitoring abnormal result, the vehicle-mounted gateway unit 300 sends an instruction to the vehicle control unit 500 to control the speed limitation, speed reduction or emergency braking of the vehicle, sends a dangerous status or dangerous behavior warning to the warning prompt unit 400 and uses a voice prompt to prompt the driver to eliminate abnormal emotions or behaviors or prompt the driver to park and rest nearby, and forwards the driver status monitoring result and action information of the vehicle control unit to the remote management unit 600.

When the fatigue status analysis component based on video analysis or the fatigue status analysis component based on sensor network analysis is in the remote management unit 600, the vehicle-mounted gateway unit 300 forwards the current driver face expression dynamic information collected by the face high-speed camera device, the current driver head and face motion and body motion posture information collected by the head and face video collection device and the body panoramic video collection device, the current driver head and face movement information collected by the head and face video collection device, and the pressure information of different points of the seat under the driver body collected by the seat pressure status collection device to the remote management unit 600: receives the analysis and recognition or determination result obtained by the remote management unit 600 after analysis and recognition or determining and sends an instruction to the vehicle control unit 500 and/or the warning prompt unit 400, and then uploads the action status of the vehicle control unit to the remote management unit 600.

Further referring to FIG. 10, the warning prompt unit 400 in this embodiment can be directly associated with the driver identity verification unit 100, the driver status monitoring unit 200, and the vehicle-mounted gateway unit 300 during specific deployment.

When the driver identity verification result received by the vehicle local warning prompt subunit and sent by the driver identity verification unit 100 or sent by the driver identity verification unit 100 through the vehicle-mounted gateway unit 300 is failure, the warning prompt unit 400 sends a sound and light warning and voice prompts the driver to adjust the posture for re-verification.

When the driver emotion recognition result, the behavior monitoring result, or the fatigue status monitoring result received by the vehicle local warning prompt subunit and sent by the driver status monitoring unit 200 or sent by the driver status monitoring unit 200 through the vehicle-mounted gateway unit 300 is abnormal, the warning prompt unit 400 sends a sound and light warning and voice prompts the driver to adjust emotions and correct an unsafe driving behavior, concentrate, or park nearby.

When the driver emotion recognition result, the behavior monitoring result, or the fatigue status monitoring result received by the vehicle local warning prompt subunit and sent by the driver status monitoring unit 200 or sent by the driver status monitoring unit 200 through the vehicle-mounted gateway unit 300 is seriously abnormal, the warning prompt unit 400 sends a sound and light warning inside and outside the vehicle and voice prompts the driver inside and outside the vehicle to adjust emotions and correct an unsafe driving behavior, concentrate, or park nearby, and prompts passers-by to be alert to abnormal vehicles, avoid them in time or call the police immediately.

When the driver identity verification result received by the remote monitoring client software warning prompt subunit and sent by the driver identity verification unit 100 through the vehicle-mounted gateway unit 300 and the communication center is failure, the warning prompt unit 400 sends a warning prompt.

When the driver emotion recognition result, the behavior monitoring result, or the fatigue status monitoring result received by the remote monitoring client software warning prompt subunit and sent by the driver status monitoring unit 200 through the vehicle-mounted gateway unit 300 and the communication center is abnormal, the warning prompt unit 400 sends a warning prompt or sends a voice prompt.

When the driver emotion recognition result, the behavior monitoring result, or the fatigue status monitoring result received by the remote monitoring client software warning prompt subunit and sent by the driver status monitoring unit 200 through the vehicle-mounted gateway unit 300 and the communication center is seriously abnormal, the warning prompt unit 400 sends an emergency warning and a voice prompt and starts the emergency management process according to the emergency plan by default.

Figure 13:
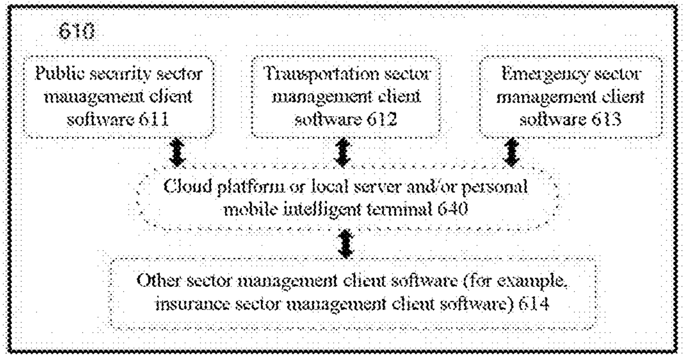
FIG. 13 is a schematic diagram of a composition principle of a government sector management client of a remote management unit according to an embodiment of the present invention.

FIG. 13 is a schematic diagram of a composition principle of the government sector management client 610 of the remote management unit based on a vehicle transportation safety monitoring system based on driver holographic management in this embodiment.

Based on FIG. 13, the government sector management client 610 of the remote management unit 600 applied to a vehicle transportation safety monitoring system in this embodiment includes public security sector management client software 611, transportation sector management client software 612, emergency sector management client software 613, and other sector management client software 614 (for example, insurance sector management client software) according to different industry departments.

The public security sector management client software 611 in the government sector management client 610 is used for driver identity verification management, driver identity management, and the driver abnormal behavior and fatigue status monitoring warning.

The driver identity verification management can be used for receiving the driver and passenger identity verification result and collecting statistics and making queries. Driver identity management can be used for receiving the driver identity information and the identity verification result, and comparing the information with motor vehicle driver license file information of the public security department for analysis. When the person's identity information or approved vehicle category is inconsistent with the driver license file information or an approved vehicle category of a personal motor vehicle driver license corresponding to the driver identity information does not include B2, a warning is sent. When the warning is sent, warning information is sent to the enterprise operation management client and the driver service client in the form of text, image, voice, and file, and linkage management information is sent according to the setting of the emergency plan. The driver abnormal behavior and fatigue status monitoring warning can be used for receiving and displaying the driver abnormal emotion and behavior and fatigue status monitoring warning information, and when receiving a high-risk warning, can be used for sending warning information to the enterprise operation management client and the driver and passenger service client in the form of text, image, voice, file, or the like and send linkage management information according to the setting of the emergency plan.

The transportation sector management client software 612 in the government sector management client 610 is used for driver identity verification management, driver authority supervision, driver abnormal behavior and fatigue status monitoring, driver and passenger file management, and driver behavior evaluation.

The driver identity verification management can be used for receiving the driver identity verification result and collect statistics and make queries. The driver authority supervision can be used for receiving and displaying the driver identity verification warning information, supervising the authority of the vehicle driven by the driver, and performing emergency authorization on the driver authority. The driver abnormal behavior and fatigue status monitoring warning can be used for receiving and displaying the driver abnormal emotion and behavior and fatigue status monitoring warning information, and when receiving a high-risk warning, can be used for sending warning information to the enterprise operation management client and the driver and passenger service client in the form of text, image, voice, file, or the like and sending linkage management information according to the setting of the emergency plan. The driver and passenger file management can be used for managing files of drivers and passengers such as the driver or the escort of a dangerous chemical transport vehicle. File management content includes name, gender. ID card numbers, company name, qualification certificate numbers, qualification certificate validity period, and personnel category. Driver behavior evaluation supports driver behavior evaluation based on relevant information such as different warning types, warning numbers, and warning levels.

The emergency sector management client software 613 in the government sector management client 610 is used for driver identity verification management and the driver abnormal behavior and fatigue status monitoring warning.

The driver identity verification management can be used for receiving the driver and passenger identity verification result and collecting statistics and making queries. The driver abnormal behavior and fatigue status monitoring warning can be used for receiving and displaying the driver abnormal emotion and behavior and fatigue status monitoring warning information, and when receiving a high-risk warning, can be used for sending warning information to the enterprise operation management client and the driver and passenger service client in the form of text, image, voice, file, or the like and sending linkage management information according to the setting of the emergency plan.

Other sector management client software (such as insurance sector management client software) 614 in the government sector management client 610 is used for driver identity verification management or the like. The driver identity verification management can be used for receiving the driver and passenger identity verification result and collecting statistics and making queries.

Other sector management client software also supports function customization according to corresponding sector management needs, or independently chooses to enable or disable related monitoring client functions within the scope of user authority, which is not limited herein.

Figure 14:
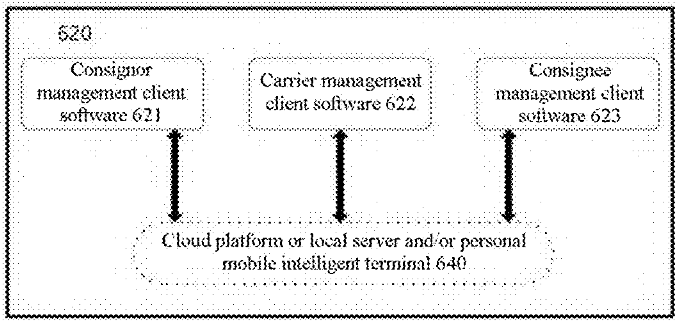
FIG. 14 is a schematic diagram of a composition principle of an enterprise operation management client of a remote management unit according to an embodiment of the present invention.

FIG. 14 is a schematic diagram of a composition principle of the enterprise operation and management client 620 of the remote management unit based on a vehicle transportation safety monitoring system based on driver holographic management in this embodiment.

Based on FIG. 14, the enterprise operation management client 620 of the remote management unit 600 applied to a vehicle transportation safety monitoring system in this embodiment includes consignor management client software 621, carrier management client software 622, and consignee management client software according to different users 623.

The consignor management client software 621 in the enterprise operation management client 620 is configured to query the driver identity information. As an example, the software supports querying identity information and a qualification certificate of a current transport driver or an escort of a dangerous goods transport vehicle corresponding to electronic waybill numbers, and a current transport identity verification result.

The carrier management client software 622 in the enterprise operation management client 620 is used for driver identity verification management, driver abnormal behavior and fatigue status monitoring, driver overtime driving warning management, driver and passenger file management, and driver behavior evaluation.

As an example, the driver identity verification management can be used for receiving the driver identity information and identity verification result, and performing identity verification and comparison analysis on the received driver and passenger identity information and driver and passenger file information of the unit and electronic waybill dispatching information. When the driver identity verification succeeds and is consistent with the driver and passenger file information of the unit and the electronic waybill dispatching information, a driving permission instruction is sent and the vehicle can be started and driven normally. When the driver identity verification fails or is inconsistent with the driver and passenger file information of the unit and the electronic waybill dispatching information, a driving forbidding instruction is sent, the vehicle cannot be started and driven normally, and warning information is sent to the driver and passenger service client in the form of text, image, voice, and file. When the driver identity verification fails or is inconsistent with the driver and passenger file information of the unit and the electronic waybill dispatching information, but the vehicle is started and driven abnormally, an emergency warning prompt is displayed and the corresponding unit of the vehicle-mounted device is controlled to send sound and light warning information inside and outside the vehicle. The driver identity verification management of the carrier management client supports remote authorization of driver permission and remote emergency start of the vehicle ACC switch, and supports statistics collection, analysis, and query of analysis results of comparison between the received driver and passenger identity verification result and driver and passenger identity information with the driver and passenger file information of the unit and the electronic way bill dispatching information.

The driver abnormal behavior and fatigue status monitoring warning can be used for receiving and displaying the driver abnormal emotion and behavior and fatigue status monitoring warning information, and when receiving the warning, sending warning information to the driver and passenger service client in the form of text, image, voice, file, or the like, and when receiving a high-risk warning, sending warning information to the driver and passenger service client in the form of text, image, voice, file, or the like, and immediately sending linkage warning information to the government sector management client synchronously according to setting of the emergency plan.

The driver overtime driving warning management can be used for receiving and displaying the driver overtime driving warning information, and when receiving the warning, sending warning information to the driver and passenger service client in the form of text, image, voice, file, or the like, and when receiving a high-risk warning, sending warning information to the driver and passenger service client in the form of text, image, voice, file, or the like, and immediately synchronously sending linkage warning information to the government sector management client according to setting of the emergency plan.

Driver and passenger file management can be used for managing files of drivers and passengers such as a driver or an escort of a dangerous chemical transport vehicle or other vehicle personnel. File management content includes information such as name, gender. ID card numbers, qualification certificate numbers, qualification certificate validity period, personnel category, personnel household registration address, actual residential address, family member, and main social relations. It supports query, addition, deletion, modification, and editing of file content of drivers and passengers. When adding, deleting, and editing content of driver and passenger file information, prompt information is sent to the driver and passenger service client. A corresponding adding or deleting person or a file information content modification and editing person logs in and confirms the modification, and then the modification takes effect. It is supported that after the driver and passenger submits the application for addition, deletion, modification, and editing through the driver and passenger service client, the carrier management client confirms the archiving manner to add, delete, modify, and edit driver and passenger file information.

Driver behavior evaluation supports driver behavior evaluation based on relevant information such as different warning types, warning numbers, warning levels, and warning processing statuses. Different warning types, warning numbers, warning levels, warning processing response time, and warning processing rates are respectively provided with different weights, and the weights support setting adjustment. The driver behavior evaluation result is quantified, quantified results are ranked and reports are generated, and it is supported to query according to the ranking of quantified evaluation results, vehicle type information, license plate number information, or driver information.

The consignee management client software 623 in the enterprise operation management client 620 is configured to query the driver identity information. As an example, the consignee management client software 623 supports querying identity information and a qualification certificate of a current transport driver or an escort of a dangerous goods transport vehicle corresponding to electronic waybill numbers, and a current transport identity verification result.

Figure 15:
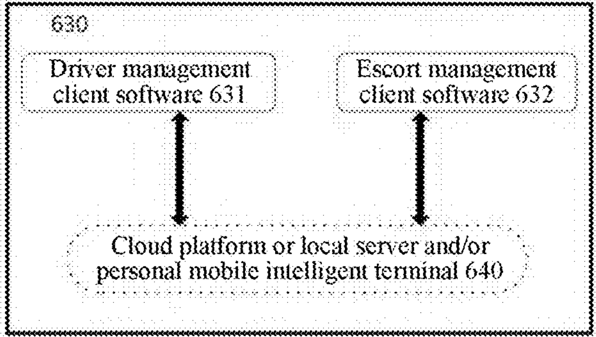
FIG. 15 is a schematic diagram of a composition principle of a driver and passenger service client of a remote management unit according to an embodiment of the present invention.

FIG. 15 is a schematic diagram of a composition principle of the driver and passenger service client 630 of the remote management unit based on a vehicle transportation safety monitoring system based on driver holographic management in this embodiment.

Based on FIG. 15, the driver and passenger service management client 630 of the remote management unit 600 applied to a vehicle transportation safety monitoring system in this embodiment includes driver service client software 631 and escort (safety personnel) service client software 632 according to different users.

The driver service client software 631 in the driver and passenger service client 630 is used for driver identity verification, driver abnormal behavior and fatigue status monitoring and warning, and driver overtime driving warning.

As an example, the driver identity verification can be used for receiving the driver identity card information and biometric information and the identity verification result, when the identity verification succeeds and is consistent with the driver and passenger file information of the unit and the electronic waybill dispatch information, receiving and voice broadcasting a driving permission instruction sent by the carrier unit management client, to remind the driver to start and drive the vehicle normally, and when the identity verification fails or is inconsistent with the driver and passenger file information of the unit and the electronic waybill dispatch information, receiving and voice broadcasting a driving forbidding instruction sent by the carrier unit management client, and voice prompting the driver to adjust the posture and check the certificate.

The driver abnormal behavior and fatigue status monitoring warning unit can receive and display the driver abnormal behavior and fatigue status monitoring warning information, when receiving a medium-risk or low-risk level warning, send warning information through voice or specific preset sound, and when receiving a high-risk warning sent by the government sector management client and the carrier management client, send warning information in the form of high-level warning content setting voice or specific high-level warning preset sound, and support feedback of a correction status and a corrective measure in the form of text, image, voice, file, or the like within a specified time.

The driver overtime driving warning can be used for receiving and displaying driver overtime driving warning information, when receiving the overtime driving warning delivered by the government sector management client and the carrier management client, broadcasting warning information through voice, and after the vehicle corrects the violation of overtime driving, automatically providing feedback of the correction of overtime driving violation to the government sector management client and the carrier management client.

The escort service client software 632 in the driver and passenger service client 630 is used for driver abnormal behavior and fatigue status monitoring and warning, and driver overtime driving warning.

As an example, the driver abnormal behavior and fatigue status monitoring warning can be used for receiving and displaying the driver abnormal behavior and fatigue status monitoring warning information, when receiving a medium-risk or low-risk level warning, sending warning information through voice or specific preset sound, and when receiving a high-risk warning sent by the government sector management client and the carrier management client, sending warning information in the form of high-level warning content setting voice or specific high-level warning preset sound, to continuously voice prompt the escort to supervise the driver to correct the abnormal behavior or park and rest when appropriate, and supporting feedback of a correction status and a corrective measure in the form of text, image, voice, file, or the like within a specified time.

The driver overtime driving warning can be used for receiving and displaying driver overtime driving warning information, when receiving the overtime driving warning delivered by the government sector management client and the carrier management client, sending warning information through voice or preset sound, giving continuous voice prompts to the escort to supervise the driver to park and rest at a proper time, and after the vehicle corrects the violation of overtime driving, automatically providing feedback of the correction of overtime driving violation to the government sector management client and the carrier management client.

Figure 16:
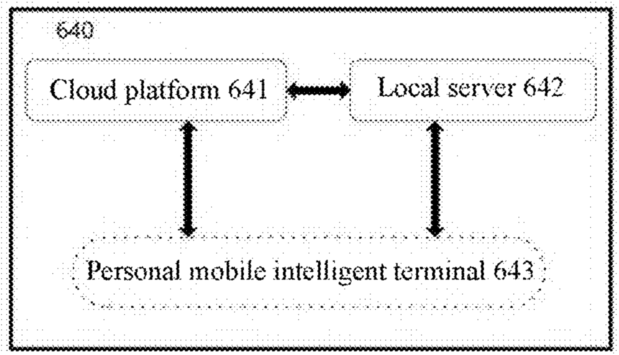
FIG. 16 is a schematic diagram of a composition principle of a communication center of a remote management unit according to an embodiment of the present invention.

FIG. 16 is a schematic diagram of a composition of the communication center 640 of the remote management unit based on a vehicle transportation safety monitoring system based on driver holographic management in this embodiment.

Based on FIG. 16, the communication center 640 of the remote management unit 600 applied to a vehicle transportation safety monitoring system provided in this embodiment includes a cloud platform 641, a local server 642, and a personal mobile intelligent terminal 643.

In this embodiment, preferably, a communication center application mode in which a cloud platform is combined with a personal mobile intelligent terminal is used, and can be determined according to the actual communication conditions of different users, and is not limited herein.

The cloud platform 641 in this communication center 640 is configured to store data information uploaded by the driver identity verification unit 100 and the driver status monitoring unit 200, perform intelligent analysis, recognition, and determining of the data information uploaded by the driver identity verification unit 100 and the driver status monitoring unit 200, receive data from the government sector management client software 610/enterprise operation management client software 620/driver and passenger service client software 630 and call a shared data resource pool, support computer hardware platform environments applied in the government sector management client software 610/enterprise operation management client software 620/driver and passenger service client software 630, and perform communication interaction between the government sector management client software 610/enterprise operation management client software 620/driver and passenger service client software 630 and the vehicle-mounted gateway unit 300.

The cloud platform 641 communicates with the vehicle-mounted gateway unit 300, receives and stores the driver ID card collection result, the driver biometric information collection result, or the identity verification result forwarded by the vehicle-mounted gateway unit 300 for the driver identity verification unit 100, and receives and stores the current driver face expression dynamic information collected by the face high-speed camera device 211 in the real-time emotion recognition module 210 of the driver status monitoring unit 200 and forwarded by the vehicle-mounted gateway unit 300 for the driver status monitoring unit 200, the current driver head face movement and body movement posture information collected by the head and face video collection device 221 and the body panorama video collection device 222 in the abnormal behavior monitoring module 220, the current driver head and face movement information collected by the head and face video collection device 231 in the fatigue status monitoring module 230, and the pressure information of different points of the seat under the driver body or the driver status monitoring result collected by the seat pressure status collection device 233. When the biometric information comparison component, the emotion intelligent analysis and recognition component, the abnormal behavior analysis and recognition component, the fatigue status analysis component based on video analysis, or the fatigue status analysis component based on sensor network analysis is set on the cloud platform 641, biometric information comparison, the emotion intelligent analysis and recognition, abnormal behavior analysis and recognition, and fatigue status analysis determination are performed by the cloud platform 641, and management instructions or response instructions of the government sector management client software 610, the enterprise operation management client software 620, and the driver and passenger service client software 630 are forwarded to the vehicle-mounted gateway unit 300.

The cloud platform 641 supports B/S monitoring client applications, and the B/S monitoring client is developed based on the latest version of China's high-security operating system and China's high-security Xinchuang browser.

The local server 642 in this communication center 640) is configured to store data information uploaded by the driver identity verification unit 100 and the driver status monitoring unit 200, perform intelligent analysis, recognition, and determining of the data information uploaded by the driver identity verification unit 100 and the driver status monitoring unit 200, receive data from the government sector management client software 610/enterprise operation management client software 620/driver and passenger service client software 630 and call a data source, support computer hardware platform environments applied in the government sector management client software 610/enterprise operation management client software 620/driver and passenger service client software 630, and perform communication interaction between the government sector management client software 610/enterprise operation management client software 620/driver and passenger service client software 630 and the vehicle-mounted gateway unit 300.

The local server 642 communicates with the vehicle-mounted gateway unit 300, receives and stores the driver ID card collection result, the driver biometric information collection result, or the identity verification result forwarded by the vehicle-mounted gateway unit 300 for the driver identity verification unit 100, and receives and stores the current driver face expression dynamic information collected by the face high-speed camera device 211 in the real-time emotion recognition module 210 of the driver status monitoring unit 200 and forwarded by the vehicle-mounted gateway unit 300 for the driver status monitoring unit 200, the current driver head face movement and body movement posture information collected by the head and face video collection device 221 and the body panorama video collection device 222 in the abnormal behavior monitoring module 220, the current driver head and face movement information collected by the head and face video collection device 231 in the fatigue status monitoring module 230, and the pressure information of different points of the seat under the driver body or the driver status monitoring result collected by the seat pressure status collection device 233.

When the biometric information comparison component, the emotion intelligent analysis and recognition component, the abnormal behavior analysis and recognition component, the fatigue status analysis component based on video analysis, or the fatigue status analysis component based on sensor network analysis is set on the local server 642, biometric information comparison, the emotion intelligent analysis and recognition, abnormal behavior analysis and recognition, and fatigue status analysis determination are performed by the local server 642, and management instructions or response instructions of the government sector management client software 610, the enterprise operation management client software 620, and the driver and passenger service client software 630 are forwarded to the vehicle-mounted gateway unit 300.

The local server 642 supports the C/S monitoring client application, and the C/S monitoring client is developed based on various latest-version high-security operating systems of the Linux kernel.

The personal hand-held intelligent terminal 643 in this communication center 640) is used for the online query tool and temporary storage space of the data information uploaded by the driver identity verification unit 100 and the driver status monitoring unit 200, supports computer hardware environments applied in the government sector management mobile client APP software 610/enterprise operation management mobile client APP software 620/driver and passenger service mobile client APP software 630, and performs the communication interaction between the government sector management mobile client APP software 610/enterprise operation management mobile client APP software 620/driver and passenger service mobile client APP software 630 and the cloud platform 641 or the local server 642 and the vehicle-mounted gateway unit 300.

The personal hand-held intelligent terminal 643 communicates with the vehicle-mounted gateway unit 300 through the cloud platform 641 or the local server 642, receives the driver ID card collection result, the driver biometric information collection result, or the identity verification result forwarded by the vehicle-mounted gateway unit 300 for the driver identity verification unit 100, receives the driver status monitoring warning information forwarded by the vehicle-mounted gateway unit 300 for the driver status monitoring unit 200 and forwarded by the cloud platform 641 or the local server 642, and forwards the management instruction or response instruction of the government sector management mobile client APP software 610/enterprise operation management mobile client APP software 620/ driver and passenger service mobile client APP software 630 to the vehicle-mounted gateway unit 300.

The personal handheld intelligent terminal 643 supports the mobile monitoring client APP application, and the mobile monitoring client APP is developed based on an operating system such as HarmonyOS micro-kernel or Android (Android) based on the Linux kernel.

In this way, the remote management unit 600 including the government sector management client software 610, the enterprise operation management client software 620, the driver and passenger service client software 630 and the communication center 640) is set on a cloud platform and/or a local storage server of the relevant government sector authorities of vehicle transportation and/or a personal hand-held intelligent terminal of the relevant management personnel, a cloud platform and/or a local storage server of a vehicle transportation enterprise and relevant transportation parties and/or a personal hand-held intelligent terminal of the relevant management personnel, and a personal hand-held intelligent terminal of driver and passenger personnel, and is connected with the vehicle-mounted gateway unit.

In this way, the remote management unit 600 receives the driver identity verification result and the driver status monitoring result sent by the vehicle-mounted gateway unit 300 and gives vehicle management and driver management control instructions, or receives a driver identity information collection result and a driver status monitoring information collection result sent by the vehicle-mounted gateway unit 300, compares and recognizes the identity information or consistency between the driver identity information and biometric information or related identity information and biometric and official archive database information and affiliated enterprise archive information, recognizes, analyzes, and determines a driver real-time emotion and/or an abnormal driving behavior and/or a fatigue status, gives vehicle management and driver management control instructions based on an emotion recognition result and/or an abnormal behavior analysis result and/or a fatigue status determination result, feeds back the instructions to the vehicle-mounted gateway unit 300, and feeds back the instructions to the warning prompt unit 400 or the vehicle control unit 500 through the vehicle-mounted gateway unit 300, to send a sound and light warning or a voice prompt or control the vehicle ACC to turn on or turn off or control the vehicle to perform speed limitation, speed reduction, or emergency braking.

When the vehicle transportation safety monitoring system based on driver management formed in his manner runs, the system can first verify the real identity of the driver of the current vehicle transportation, and bind the real identity information of the driver with the driving permission of the designated operating vehicle and the activation permission of the current specific vehicle, to prevent the vehicle from being activated and driven by a non-designated driver, causing uncontrollable traffic safety accidents, thereby ensuring the safety of vehicle transportation from the source of driving.

On this basis, the system further monitors the legal driver real-time emotion status and driving behavior and fatigue status during vehicle driving, and automatically control the vehicle driving status in a linkage manner through active driving assisted by safety prevention and control according to the monitoring result and give a safety warning to the driver, to prevent unsafe driving behaviors due to abnormal emotions and behaviors and excessive fatigue of the driver, so as to further ensure the safety of vehicle transportation.

The basic principles, main features, and advantages of the present invention have been shown and described above. Those skilled in the industry should understand that the present invention is not limited by the above-mentioned embodiments. Descriptions in the above-mentioned embodiments and the specification only illustrate the principle of the present invention. The present invention also has various variations and improvements without departing from the spirit and scope of the present invention, which shall fall within the scope claimed in the present invention. The protection scope claimed by the present invention is defined by the appended claims and their equivalents.

What is claimed is:

1. A vehicle transportation safety monitoring system based on driver holographic management, comprising:

a driver identity verification unit, comprising an ID card reading module, a biometric information collection module, and a biometric information comparison module, wherein the driver identity verification unit is configured to collect current driver certificate information and/or biometric information, compare the currently collected driver real-time identity information and/or biometric information with stored driver identity information and/or biometric information for verification, and control a working status of a vehicle starting system according to a verification result;

a driver status monitoring unit, comprising a real-time emotion recognition module, an abnormal behavior monitoring module, and a fatigue status monitoring module, wherein the driver status monitoring unit monitors a driver emotion, a driving behavior, and a physical fatigue status in real time and performs emotion recognition, behavior analysis, and fatigue status determination, and is directly associated with a vehicle control unit or associated with the vehicle control unit through a vehicle-mounted gateway unit according to a real-time emotion recognition result, an abnormal behavior analysis result, and a fatigue status determination result, to control a vehicle running status;

the vehicle-mounted gateway unit, wherein the vehicle-mounted gateway unit is respectively associated with the driver identity verification unit, the driver status monitoring unit, the vehicle control unit, a warning prompt unit, and a remote management unit; and the vehicle-mounted gateway unit is configured to further cooperate with the driver identity verification unit and/or the driver status monitoring unit to complete driver identity verification and/or driver status monitoring;

the vehicle control unit, wherein the vehicle control unit is linked with the starting system, a speed control system, and a braking system of the vehicle, and is associated with the vehicle-mounted gateway unit, the driver identity verification unit, and the driver status monitoring unit, and the vehicle control unit controls, according to a driver identity verification result sent by the driver identity verification unit or the vehicle-mounted gateway unit, whether the vehicle is capable of being started, and controls a driving status of the vehicle according to a driver real-time emotion status analysis result, a driving behavior analysis result, and a fatigue status determination result sent by the driver status monitoring unit or the vehicle-mounted gateway unit;

the warning prompt unit, wherein the warning prompt unit is respectively connected and coordinated with the driver identity verification unit, the driver status monitoring unit, and the vehicle-mounted gateway unit;

the remote management unit comprising a government sector management client, an enterprise operation management client, a driver and passenger service client, and a communication center, wherein the remote management unit cooperates with the driver identity verification unit and/or the driver status monitoring unit to complete driver identity verification and/or driver status monitoring through the vehicle control unit, and is configured to give corresponding vehicle management and driver management control instructions and feed back the instructions to the vehicle-mounted gateway unit;

the government sector management client of the remote management unit comprises public security sector management client software, transportation sector management client software, and emergency sector management client software according to different charging industry departments; the public security sector management client software is used for driver identity verification management, driver identity management, and driver abnormal behavior and fatigue status monitoring and warning; the transportation sector management client software is used for driver identity verification management, driver permission supervision, driver abnormal behavior and fatigue status monitoring, driver and passenger file management, and driver behavior evaluation; the emergency sector management client software is used for driver identity verification management, and driver abnormal behavior and fatigue status monitoring and warning; and the other sector management client software is used for driver identity verification management;

the enterprise operation management client of the remote management unit comprises consignor management client software, carrier management client software, and consignee management client software according to different users; the consignor management client software is used for driver identity information query; the carrier management client software is used for driver identity verification and management, driver abnormal behavior and fatigue status monitoring, driver overtime driving warning management, driver and passenger file management, and driver behavior evaluation; and the consignee management client software is used for driver identity information query;

the driver and passenger service management client of the remote management unit comprises driver service client software and escort service client software according to different users; the driver service client software is used for driver identity verification, driver abnormal behavior and fatigue status monitoring and warning, and driver overtime driving warning; and the escort service client software is used for driver abnormal behavior and fatigue status monitoring and warning and driver overtime driving warning; and the communication center of the remote management unit comprises a cloud platform, a local server, and a personal mobile intelligent terminal; the cloud platform is configured to store data information uploaded by the driver identity verification unit and the driver status monitoring unit, perform intelligent analysis, recognition, and determining of the data information uploaded by the driver identity verification unit and the driver status monitoring unit, receive data from the government sector management client software/enterprise operation management client software/driver and passenger service client software and call a shared data resource pool, support computer hardware platform environments applied in the government sector management client software/enterprise operation management client software/driver and passenger service client software, and perform communication interaction between the government sector management client software/enterprise operation management client software/driver and passenger service client software and the vehicle-mounted gateway unit the local server is configured to store data information uploaded by the driver identity verification unit and the driver status monitoring unit, perform intelligent analysis, recognition, and determining of the data information uploaded by the driver identity verification unit and the driver status monitoring unit, receive data from the government sector management client software/enterprise operation management client software/driver and passenger service client software and call a data source, support computer hardware platform environments applied in the government sector management client software/enterprise operation management client software/driver and passenger service client software, and perform communication interaction between the government sector management client software/enterprise operation management client software/driver and passenger service client software and the vehicle-mounted gateway unit and a personal hand-held intelligent terminal communicates with the vehicle-mounted gateway unit through the cloud platform or the local server, receives a driver identity certificate collection result, a driver biometric information collection result, or an identity verification result forwarded by the vehicle-mounted gateway unit for the driver identity verification unit, receives driver status monitoring warning information forwarded by the vehicle-mounted gateway unit for the driver identity verification unit and forwarded by the cloud platform or the local server, and forwards the management instruction or response instruction of the government sector management mobile client software/enterprise operation management mobile client software/driver and passenger service mobile client software to the vehicle-mounted gateway unit.

2. The vehicle transportation safety monitoring system according to claim 1, wherein the driver identity verification unit comprises an ID (short for identification) card reading module, a biometric information collection module, and a biometric information comparison module;

the ID card reading module comprises a second-generation resident ID card reading device, an IC (short for integrated circuit) card practitioner qualification certificate reading device and/or a motor vehicle driver license reading device and/or another certificate (for example, a pass) reading device, and is configured to obtain identity information of a current driver certificate, and transmit the obtained identity information of the certificate to a biometric information comparison module of the ID card reading module or a biometric information comparison module of the vehicle-mounted gateway unit or a biometric information comparison module of the remote management unit through the vehicle-mounted gateway unit;

the biometric information collection module comprises a face information collection device, a fingerprint information collection device, an iris information collection device, a finger vein information collection device, a palm vein information collection device, a palmprint information collection device, a retina information collection device, and a voice information collection device, and is configured to obtain current driver biometric information, and transmit the obtained information to a biometric information comparison module of the biometric information collection module or a biometric information comparison module of the vehicle-mounted gateway unit or a biometric information comparison module of the remote management unit through the vehicle-mounted gateway unit; and the biometric information comparison module comprises a face information comparison device, a fingerprint information comparison device, an iris information comparison device, a finger vein information comparison device, a palm vein information comparison device, a palmprint information comparison device, a retina information comparison device, a sound information comparison device, and is configured to compare obtained biometric information corresponding to the driver certificate identity information with current driver biometric information for verification to determine whether the information belongs to a same person.

3. The vehicle transportation safety monitoring system according to claim 1, wherein the driver status monitoring unit comprises a real-time emotion recognition module and/or an abnormal behavior monitoring module and/or a fatigue status monitoring module;

the real-time emotion recognition module comprises a face high-speed camera device and an emotion intelligent analysis and recognition device, and is configured to obtain the current driver face expression dynamics, and transmit the obtained face expression dynamics to an intelligent emotion analysis module of the real-time emotion recognition module or an intelligent emotion analysis module of the vehicle-mounted gateway unit or an intelligent emotion analysis module of the remote management unit through the vehicle-mounted gateway unit; wherein the face high-speed camera device is configured to collect current driver face expression dynamics, and the intelligent emotion analysis and recognition device is configured to perform intelligent analysis and recognition on the face expression dynamics collected by the face high-speed camera device, and determine a current driver real-time emotion status;

the abnormal behavior monitoring module comprises a head and face video collection device, a body panorama video collection device, and an abnormal behavior analysis and recognition device, and is configured to obtain a current driver face movement or body movement, and transmit the obtained face movement or body movement to an abnormal behavior analysis module of the abnormal behavior monitoring module or an abnormal behavior analysis module of the vehicle-mounted gateway unit or to an abnormal behavior analysis module of the remote management unit through the vehicle-mounted gateway unit; the head and face video collection device is configured to collect a current driver head and face movement; the body panorama video collection device is configured to collect a current driver body movement posture; and the abnormal behavior analysis and recognition device is configured to perform intelligent analysis and recognition on the head and face movement collected by the head and face video collection device and the body movement posture collected by the body panorama video collection device, to determine whether a current driver real-time behavior status is abnormal; and the fatigue status monitoring module comprises a head and face video collection device, a fatigue status analysis device based on video analysis, a seat pressure status collection device, and a fatigue status analysis device based on sensor network analysis; and is configured to obtain current driver fatigue status monitoring information, and transmit the obtained information to a fatigue status determination module of the fatigue status monitoring module or a fatigue status determination module of the vehicle-mounted gateway unit or a fatigue status determination module of the remote management unit through the vehicle-mounted gateway unit; and the head and face video collection device is configured to collect a current driver head and face movement; the fatigue status analysis device based on video analysis is configured to perform intelligent analysis and recognition on the head and face movement collected by the head and face video collection device, to determine a current driver real-time fatigue level; the seat pressure status collection device is configured to collect pressure distribution of different points of a seat under the driver; and the fatigue status analysis device based on sensor network analysis is configured to perform intelligent analysis and recognition on the pressure status of the different points of the seat under the driver body collected by the seat pressure status collection device, to determine the current driver real-time fatigue level.

4. The vehicle transportation safety monitoring system according to claim 1, wherein the vehicle-mounted gateway unit comprises a network communication module and/or a data storage module and/or an edge computing module;

the network communication module comprises one or more of a 5G communication device, a CAN (short for controller area network) bus communication device, a TCP/IP (short for transmission control protocol/internet protocol) communication device, and a Bluetooth communication device, and is configured to perform data exchange between the driver identity verification unit or the driver status monitoring unit and the warning prompt unit, the vehicle control unit, and the remote management unit;

the data storage module comprises a built-in data storage device and an external data storage device, and is configured to store data exchanged between the driver identity verification unit or the driver status monitoring unit and the warning prompt unit, the vehicle control unit, and the remote management unit; and the edge computing module comprises an AI (short for artificial intelligence) intelligent chip with an edge computing function and a terminal SDK (short for software development kit) with edge computing, and is configured to perform driver identity verification and emotion intelligent analysis and recognition and/or abnormal behavior analysis and recognition and/or fatigue status analysis and determination based on the data exchanged between the driver identity verification unit or the driver status monitoring unit and the warning prompt unit, the vehicle control unit, and the remote management unit.

5. The vehicle transportation safety monitoring system according to claim 1, wherein the warning prompt unit comprises a vehicle local warning prompt subunit and a remote monitoring client software warning prompt subunit.

6. The vehicle transportation safety monitoring system according to claim 1, wherein the vehicle control unit comprises an ACC (short for accessory) vehicle start control module and/or an anti-lock brake module and/or a speed limit management module and/or an intelligent brake management module and/or an electronic brake assist module, the vehicle control unit is directly associated with the driver identity verification unit, the driver status monitoring unit, and the vehicle-mounted gateway unit, when the vehicle control unit receives a driver identity verification success result or receives a driver identity verification success result forwarded by the vehicle-mounted gateway unit for the driver identity verification unit, the vehicle control unit controls an vehicle ACC to turn on; when the vehicle control unit receives a driver identity verification failure result, the vehicle control unit controls the vehicle ACC to turn off; and when the vehicle control unit receives a driver status monitoring abnormal result, the vehicle control unit controls the vehicle to perform speed limitation, speed reduction, or emergency braking;

the ACC vehicle start control module is configured to determine, according to the received driver identity verification result, whether to allow a vehicle switch to turn on, wherein the vehicle is allowed to start when the driver identity verification result is success, and the vehicle is not allowed to start when the driver identity verification result is failure;

the anti-lock brake module is configured to avoid, when an abnormal driver status monitoring result is received, losing control over a vehicle driving direction or skidding that is possible during emergency braking;

the speed limit management module is configured to control a vehicle maximum driving speed when receiving the abnormal driver status monitoring result;

the intelligent brake management module is configured to start the intelligent brake device to reduce a vehicle real-time driving speed when receiving the abnormal driver status monitoring result; and the electronic brake system module is configured to rapidly start a full braking force if emergency braking is required when the abnormal driver status monitoring result is received.

7. The vehicle transportation safety monitoring system according to claim 1, wherein the remote management unit receives the driver identity verification result and the driver status monitoring result sent by the vehicle-mounted gateway unit and gives vehicle management and driver management control instructions, or receives a driver identity information collection result and a driver status monitoring information collection result sent by the vehicle-mounted gateway unit, compares and recognizes the identity information or consistency between the driver identity information and biometric information or related identity information and biometric information, recognizes, analyzes, and determines a driver real-time emotion and/or an abnormal driving behavior and/or a fatigue status, gives vehicle management and driver management control instructions based on an emotion recognition result and/or an abnormal behavior analysis result and/or a fatigue status determination result, feeds back the instructions to the vehicle-mounted gateway unit, and feeds back the instructions to the warning prompt unit or the vehicle control unit through the vehicle-mounted gateway unit, to send a sound and light warning or a voice prompt or control a vehicle ACC to turn on or turn off or control the vehicle to perform speed limitation, speed reduction, or emergency braking.

8. The vehicle transportation safety monitoring system according to claim 1, wherein the remote management unit receives the driver identity verification result and the driver status monitoring result sent by the vehicle-mounted gateway unit and gives vehicle management and driver management control instructions, or receives a driver identity information collection result and a driver status monitoring information collection result sent by the vehicle-mounted gateway unit, compares and recognizes the identity information or consistency between the driver identity information and biometric information or related identity information and biometric information, recognizes, analyzes, and determines a driver real-time emotion and/or an abnormal driving behavior and/or a fatigue status, gives vehicle management and driver management control instructions based on an emotion recognition result and/or an abnormal behavior analysis result and/or a fatigue status determination result, feeds back the instructions to the vehicle-mounted gateway unit, and feeds back the instructions to the warning prompt unit or the vehicle control unit through the vehicle-mounted gateway unit, to send a sound and light warning or a voice prompt or control a vehicle ACC to turn on or turn off or control the vehicle to perform speed limitation, speed reduction, or emergency braking.

* * * * *